(12) United States Patent
Wessel et al.

(10) Patent No.: US 8,684,070 B2
(45) Date of Patent: Apr. 1, 2014

(54) COMPACT RADIAL PLATEN ARRANGEMENT FOR RADIANT SYNGAS COOLER

(75) Inventors: Richard A. Wessel, Massillon, OH (US); David L. Kraft, Massillon, OH (US); Steven R. Fry, Lake Township, Stark County, OH (US)

(73) Assignee: Babcock & Wilcox Power Generation Group, Inc., Barberton, OH (US)

( * ) Notice: Subject to any disclaimer, the term of this patent is extended or adjusted under 35 U.S.C. 154(b) by 1097 days.

(21) Appl. No.: 11/839,285

(22) Filed: Aug. 15, 2007

(65) Prior Publication Data

US 2008/0041572 A1   Feb. 21, 2008

Related U.S. Application Data

(60) Provisional application No. 60/837,773, filed on Aug. 15, 2006.

(51) Int. Cl.
*F28F 9/26* (2006.01)
*F28D 7/00* (2006.01)
*C10J 3/86* (2006.01)

(52) U.S. Cl.
USPC .................. 165/145; 165/157; 48/69; 122/7 R

(58) Field of Classification Search
USPC ................ 165/145, 157; 48/69; 122/7 R
See application file for complete search history.

(56) References Cited

U.S. PATENT DOCUMENTS

| | | | | |
|---|---|---|---|---|
| 2,930,405 A * | 3/1960 | Welsh | ........................... | 165/179 |
| 3,666,423 A * | 5/1972 | Muenger | ........................ | 165/157 |
| 4,513,694 A * | 4/1985 | Wiemer | ........................ | 122/7 R |
| 4,535,727 A * | 8/1985 | Ziegler | ........................... | 122/32 |
| 4,707,163 A * | 11/1987 | Gudymov et al. | ................ | 48/73 |
| 4,765,394 A * | 8/1988 | Ziegler | ........................... | 165/95 |
| 4,768,470 A * | 9/1988 | Ziegler | ........................... | 122/7 R |
| 4,841,917 A * | 6/1989 | Premel | ........................... | 122/379 |
| 4,936,376 A | 6/1990 | Martin et al. | | |
| 5,233,943 A | 8/1993 | Martin et al. | | |
| 5,251,575 A | 10/1993 | Michel | | |
| 5,386,871 A * | 2/1995 | Master et al. | .................. | 165/145 |
| 5,482,110 A * | 1/1996 | Hartermann et al. | ......... | 165/145 |
| 5,713,312 A * | 2/1998 | Waryasz | ........................ | 122/481 |
| 5,814,189 A * | 9/1998 | Stigsson et al. | ............ | 162/30.11 |
| 6,051,195 A | 4/2000 | Deeke et al. | | |
| 6,138,746 A * | 10/2000 | Livolsi et al. | .................. | 165/145 |
| 7,055,583 B2 * | 6/2006 | Filippi et al. | .................. | 165/145 |
| 7,090,707 B1 * | 8/2006 | Barot | ................................ | 48/73 |
| 7,204,301 B2 * | 4/2007 | Filippi et al. | .................. | 165/157 |
| 7,587,995 B2 * | 9/2009 | Kraft et al. | .................... | 122/7 R |
| 7,621,973 B2 * | 11/2009 | Wallace | ........................ | 48/213 |
| 2007/0079554 A1 * | 4/2007 | Schingnitz et al. | ............. | 48/210 |
| 2007/0272129 A1 * | 11/2007 | Schilder | ........................ | 110/171 |

FOREIGN PATENT DOCUMENTS

WO    WO 9110106 A * 7/1991

OTHER PUBLICATIONS

Tampa Electric Integrated Gasification Combined-Cycle Project an Update, Topical 19, Jul. 2000.
Tampa Electric Polk Power Station Integrated Gasification Combined Cycle Project Final Technical Report, Aug. 2002.
Clean Coal Technology, DOE/NETL—2004/1207, Tampa Electric Integrated Gasification Combined-Cycle Project, Aug. 2004.

* cited by examiner

*Primary Examiner* — Leonard R Leo
(74) *Attorney, Agent, or Firm* — Eric Marich

(57) ABSTRACT

A radiant synthesis gas (syngas) cooler used to contain and cool the synthesis gas produced by a coal gasification process used in an IGCC power plant employs a compact radial platen arrangement which is less prone to fouling and/or plugging issues.

29 Claims, 17 Drawing Sheets

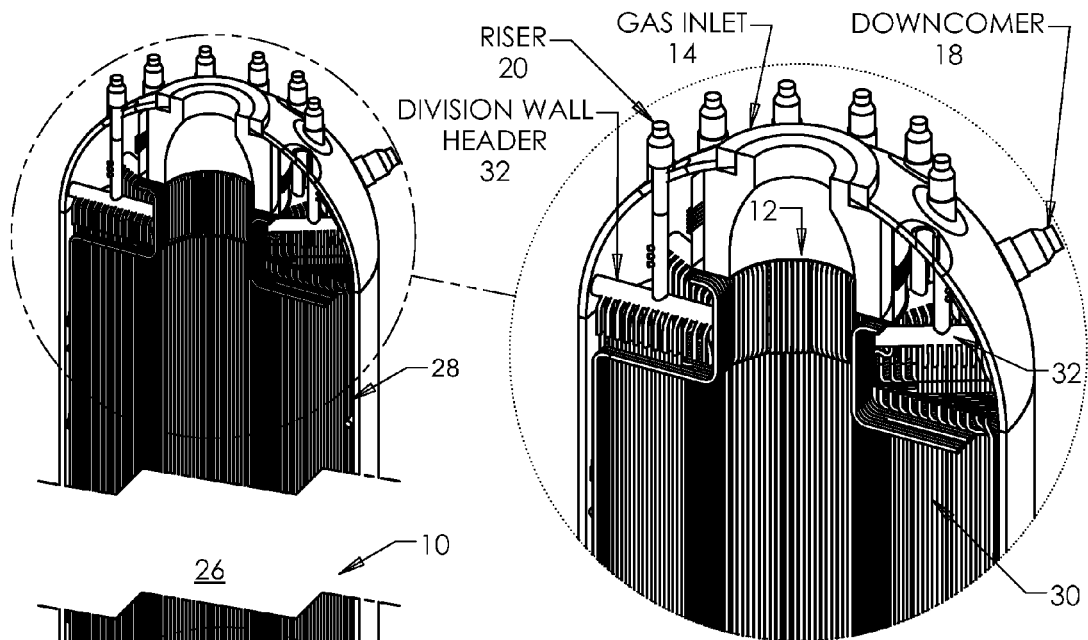
FIG. 4
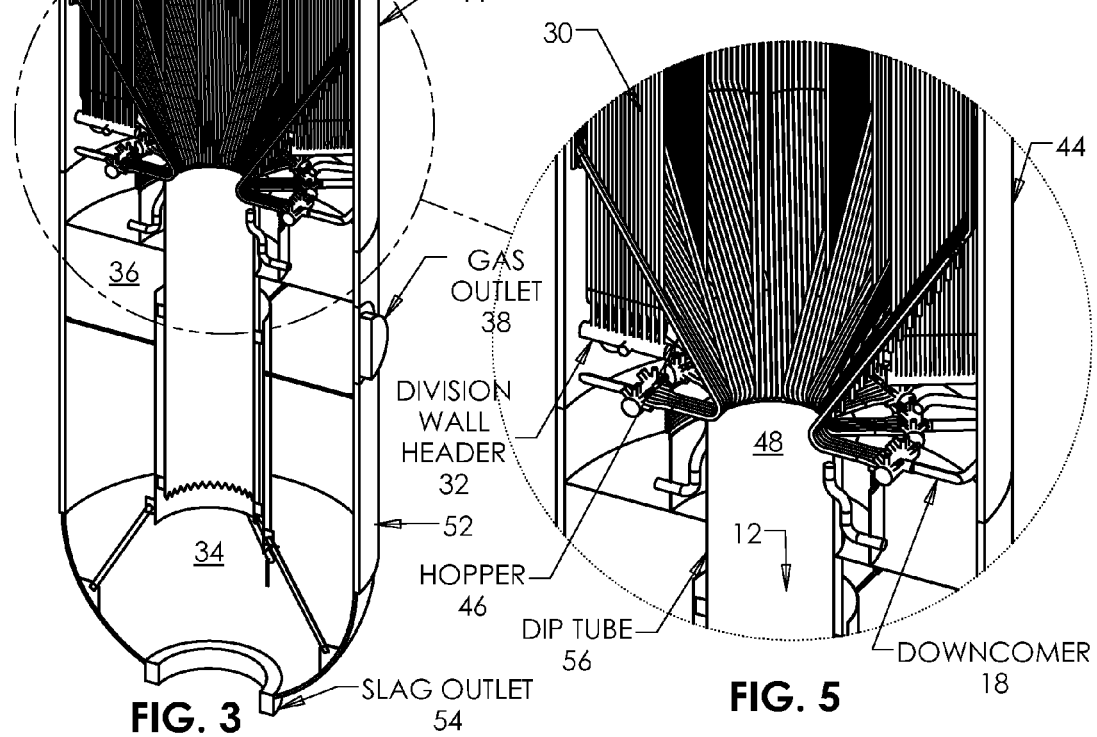
FIG. 3
FIG. 5

Case 1        Case 2

Case 1                   Case 2

COMPACT RADIAL PLATEN ARRANGEMENT FOR RADIANT SYNGAS COOLER

This application claims priority to previously filed U.S. Provisional Patent Application No. 60/837,773, filed Aug. 15, 2006, titled "Compact Radial Platen Arrangement for Radiant Syngas Cooler," which is hereby incorporated by reference as though fully set forth herein.

FIELD AND BACKGROUND OF INVENTION

The present invention relates generally to the field of coal gasification and, in particular, to a radiant synthesis gas (syngas) cooler for use in a coal gasification process. In one instance, the present invention relates to a radiant synthesis gas (syngas) cooler for an Integrated Gasification Combined Cycle (IGCC) power plant. In this embodiment, the radiant syngas cooler is used to contain and cool the synthesis gas produced by a coal gasification process used in the IGCC power plant.

IGCC power plants firing solid fuels have traditionally been higher capital cost and have had lower operating availability and reliability than competing solid fuel technologies such as pulverized coal combustion Rankine cycles. Primary components to be improved upon to make IGCC more competitive include uncooled gasifiers and radiant and convective synthesis gas coolers.

The radiant syngas cooler (RSC) is a component of an integrated gasification combined cycle (IGCC) power plant using the GE/Texaco entrained-flow coal gasification process. A stream of hot syngas and slag from the gasifier enters the RSC at 2300° F. to 2700° F. and operating pressure of 500 to 900 psia. The RSC recovers heat from the syngas to generate steam, and removes most of the entrained solids. The syngas leaves the RSC at 400° F. to 500° F., after which it goes to a gas cleanup system and the gas turbine for power generation.

In the first stage of the RSC, heat is recovered in a radiant boiler to generate high pressure saturated steam. The radiant boiler is a cylindrical enclosure constructed with water-cooled tubes and membrane, known as the "cage-wall". There are several division walls, or platens, inside the cage-wall (also water cooled) to enhance radiant heat transfer from the gas. Syngas leaves the radiant boiler at 1100° F. to 1300° F. where it enters the second stage of the RSC, a water quench system that is used to separate the slag and particulate from the syngas and further cool the gas to the desired outlet temperature of 400° F. to 500° F. Finally, a large pressure vessel encloses the radiant boiler, steam generation system, water quench and slag removal systems, to maintain the system operating pressure. The cost of the RSC is overwhelmingly driven by the size of the pressure vessel. Therefore, reducing the size and weight of the vessel is critical to cost reduction.

An existing arrangement of platens (the straight, radially oriented, lines in FIG. 1) used in the Tampa Electric Polk Power Station Unit #1 is shown in the cross-section view of a radiant syngas cooler 10 of FIG. 8. In RSC 10 of FIG. 8, there are 12 division walls 30 that act as radial platens. These division walls, or radial platens, 30 are arranged like the spokes of a wheel, where such radial platens are uniformly spaced at intervals of 30 degrees. The design of RSC 10 will be explained in further detail below.

A similar, but slightly more compact RSC arrangement is shown in the RSC of FIG. 11, where the RSC is shown in simplified form with only the enclosure wall 28 and the radial platens 30 being shown (i.e., the platens 30 are shown as straight lines rather than illustrating the individual tubes that make-up such division walls, or radial platens, 30). In the case of the RSC of FIG. 12, there are 18 divisional walls, or radial platens, 30 that are uniformly spaced at intervals of 20 degrees. As would be appreciated by those of skill in the art, the RSC of FIGS. 11 and 12 illustrate known placement and number of division walls, or radial platens, 30. Regarding the design of FIG. 11, this design is the design that is utilized in a 600 MW IGCC power plant at Polk Power Station.

Others have proposed non-planar platen arrangements. In all of these designs, the platens are confined to an annular region of the furnace plan area within the RSC. The center of the furnace is open to allow large slag particles to fall through the RSC without excessive deposition on the platens.

To date, all RSCs in use suffer from one or more drawbacks including, but not limited to, less than optimal heat transfer, fouling issues, plugging issues, and/or size issues (i.e., are larger in size than desired in order to address and/or overcome various fouling and/or plugging issues).

Accordingly, there is a need in the art for a RSC device that is both more compact in nature and less apt to fouling and/or plugging issues.

SUMMARY OF INVENTION

The present invention relates generally to the field of coal gasification and, in particular, to a radiant synthesis gas (syngas) cooler for use in a coal gasification process. In one instance, the present invention relates to a radiant synthesis gas (syngas) cooler for an Integrated Gasification Combined Cycle (IGCC) power plant. In this embodiment, the radiant syngas cooler is used to contain and cool the synthesis gas produced by a coal gasification process used in the IGCC power plant.

In one embodiment, the present invention relates to a synthesis gas cooler for extracting heat from synthesis gas produced by a gasification process, comprising: a shell having a synthesis gas inlet and a synthesis gas outlet; a fluid-cooled flue contained within the shell for receiving synthesis gas; fluid-cooled radiant heat transfer surface partially extending within the flue for cooling the synthesis gas; and means for conveying the synthesis gas from the flue to the synthesis gas outlet, wherein the fluid-cooled radiant heat transfer surface comprises at least two sets of platens, a first set of platens having a first length and a second set of platens having a second length where the first length is longer than the second length.

In another embodiment, the present invention relates to a synthesis gas cooler for extracting heat from synthesis gas produced by a gasification process, comprising: a shell having a synthesis gas inlet and a synthesis gas outlet; a fluid-cooled flue contained within the shell for receiving synthesis gas; fluid-cooled radiant heat transfer surface partially extending within the flue for cooling the synthesis gas; and means for conveying the synthesis gas from the flue to the synthesis gas outlet, wherein the fluid-cooled radiant heat transfer surface comprises at least three sets of platens, a first set of platens having a first length, a second set of platens having a second length, and a third set of platens having a third length, where the first length is longer than the second length and the second length is longer than the third length.

In still another embodiment, the present invention relates to a synthesis gas cooler for extracting heat from synthesis gas produced by a gasification process, comprising: a shell having a synthesis gas inlet and a synthesis gas outlet; a fluid-cooled flue contained within the shell for receiving synthesis gas; fluid-cooled radiant heat transfer surface partially extending within the flue for cooling the synthesis gas; and means for conveying the synthesis gas from the flue to the synthesis gas outlet, wherein the fluid-cooled radiant heat transfer surface comprises at least four sets of platens, a first set of platens having a first length, a second set of platens having a second length, a third set of platens having a third length, and a fourth set of platens having a fourth length, where the first length is longer than the second length, the second length is longer than the third length, and the third length is longer than the fourth length.

BRIEF DESCRIPTION OF THE DRAWINGS

FIG. 3 is a perspective view, partly in section, of the radiant syngas cooler of FIG. 1;

FIG. 4 is a perspective view, partly in section, of an upper portion of the radiant syngas cooler of FIG. 3;

FIG. 5 is a perspective view, partly in section, of a lower portion of the radiant syngas cooler of FIG. 3;

DESCRIPTION OF THE PREFERRED EMBODIMENTS

Figures 1, 2:
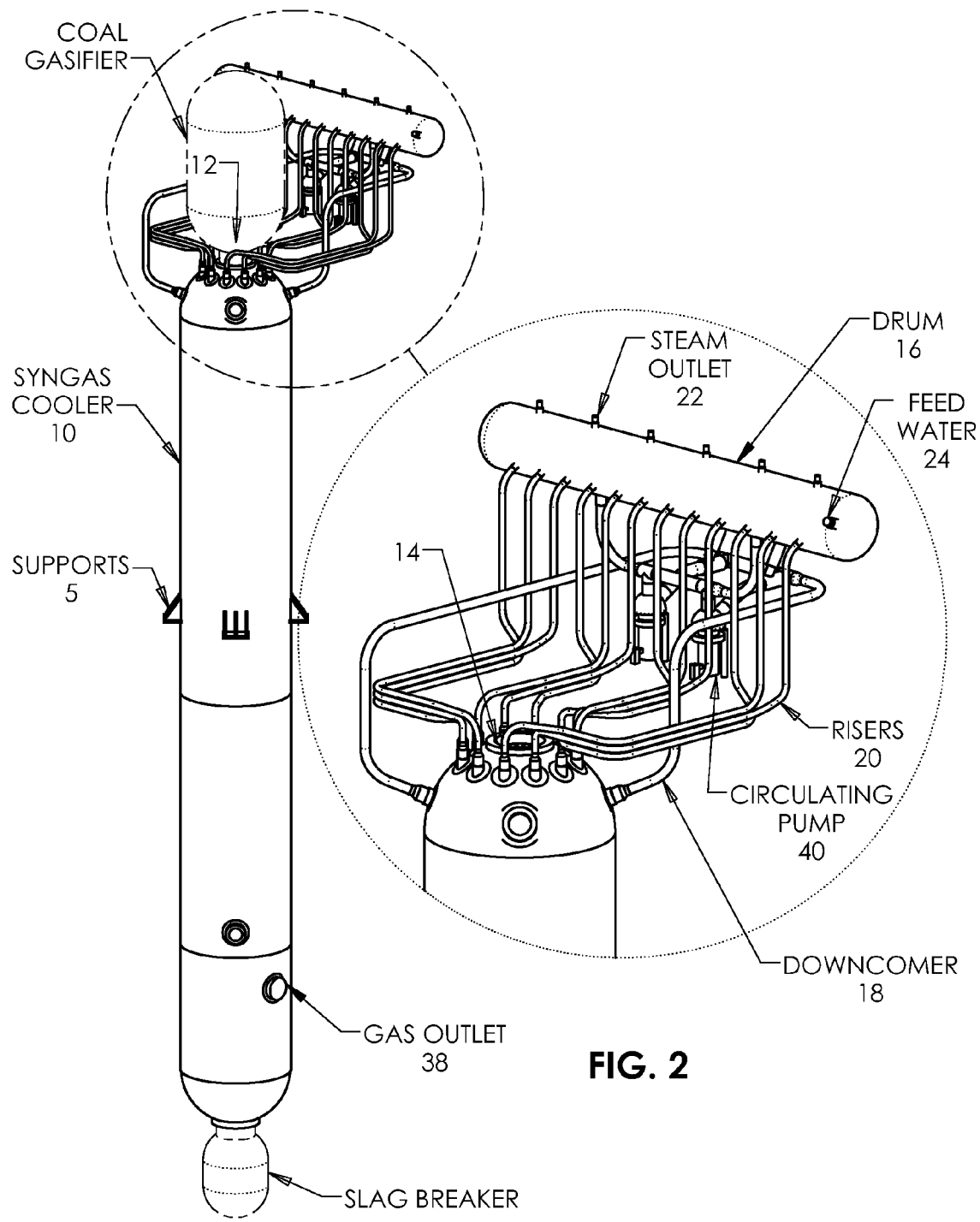
FIG. 1 is an outside perspective view of a radiant syngas cooler and selected auxiliary equipment according to a first embodiment of the present invention.
FIG. 2 is an outside perspective view of an upper portion of the radiant syngas cooler of FIG. 1.
Figure 6:
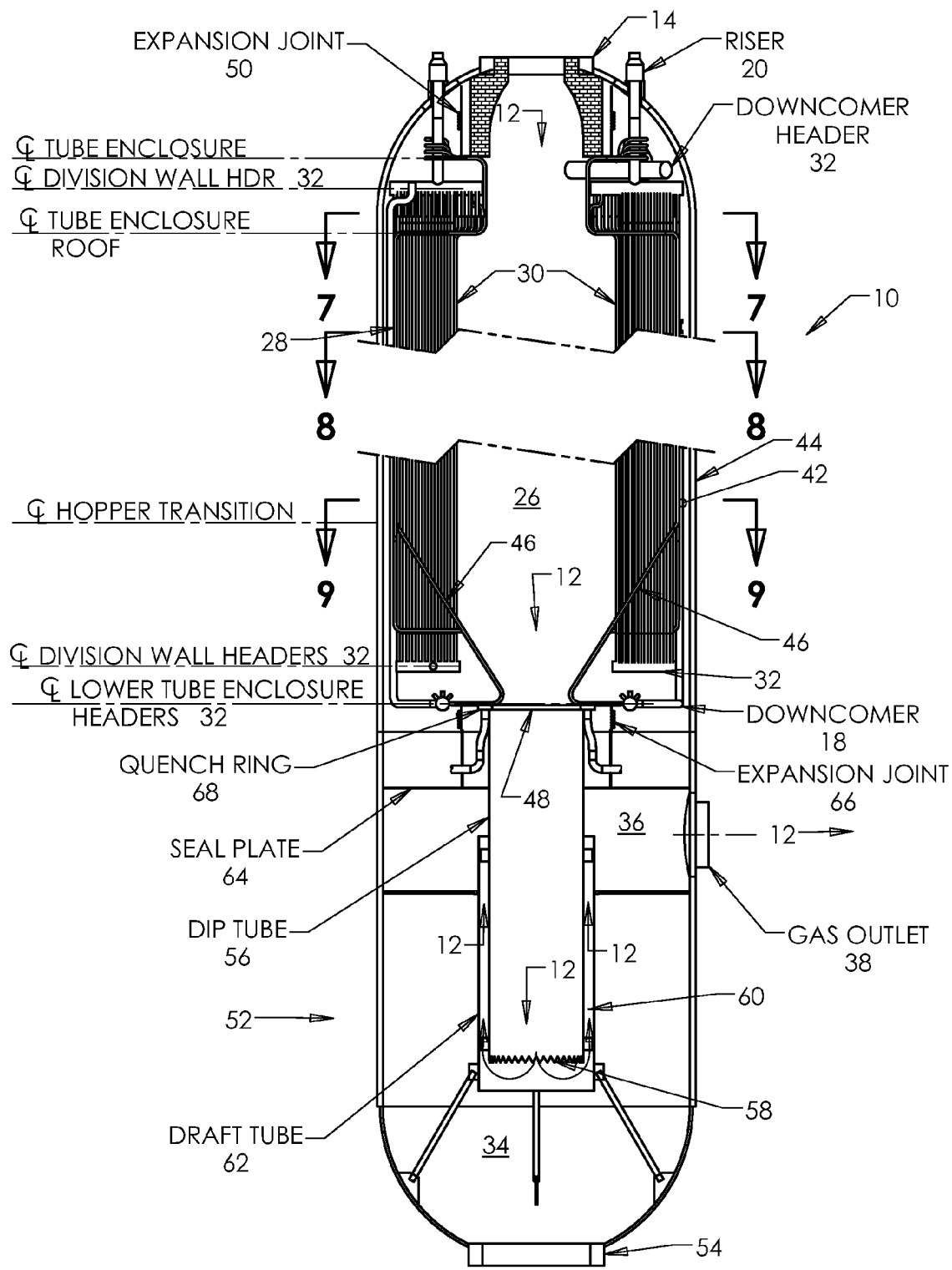
FIG. 6 is sectional side view of a first embodiment of the radiant syngas cooler according to the present invention.
Figure 7:
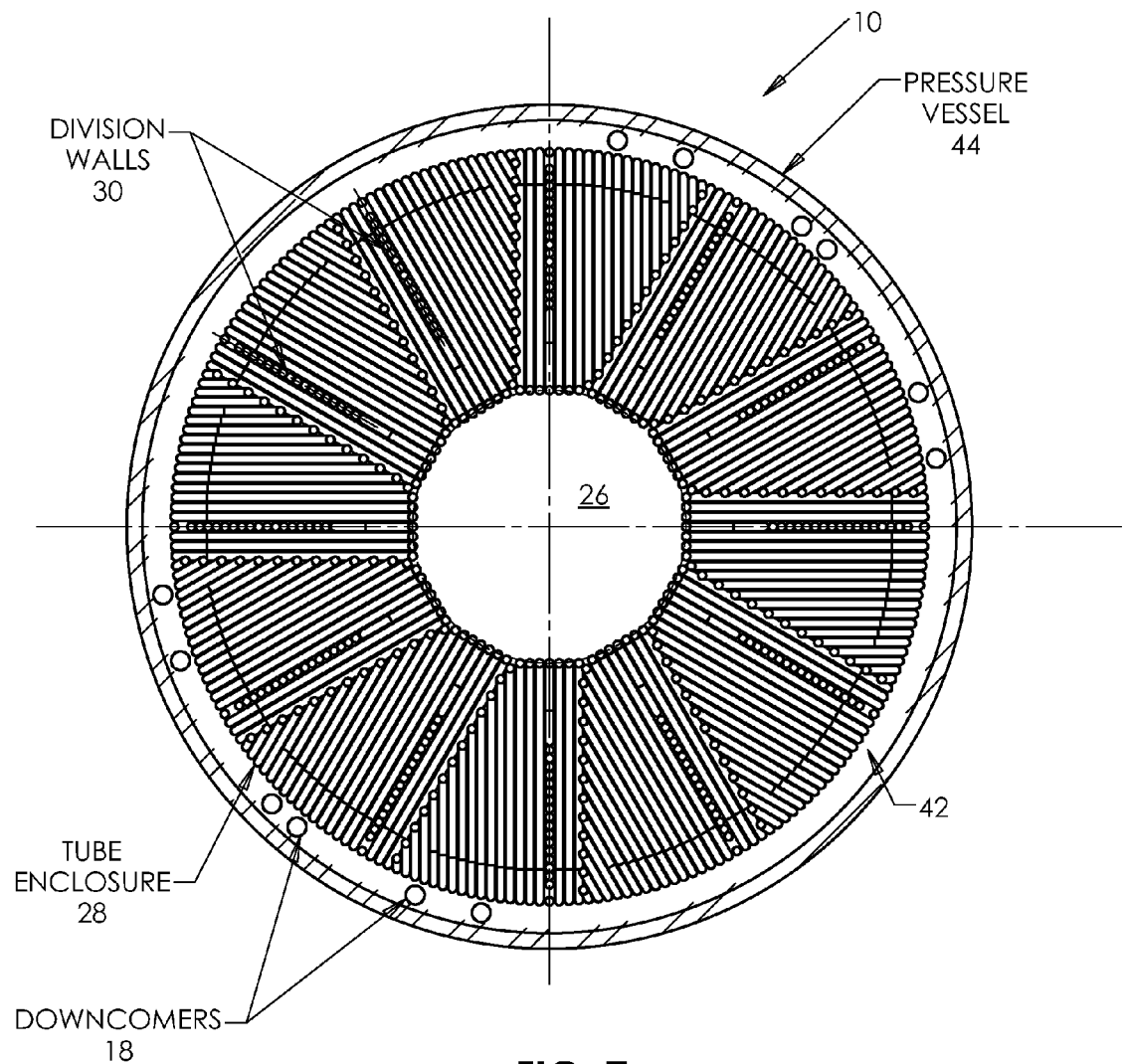
FIG. 7 is a sectional view of FIG. 6 viewed in the direction of arrows 7-7 of FIG. 6.
Figure 8:
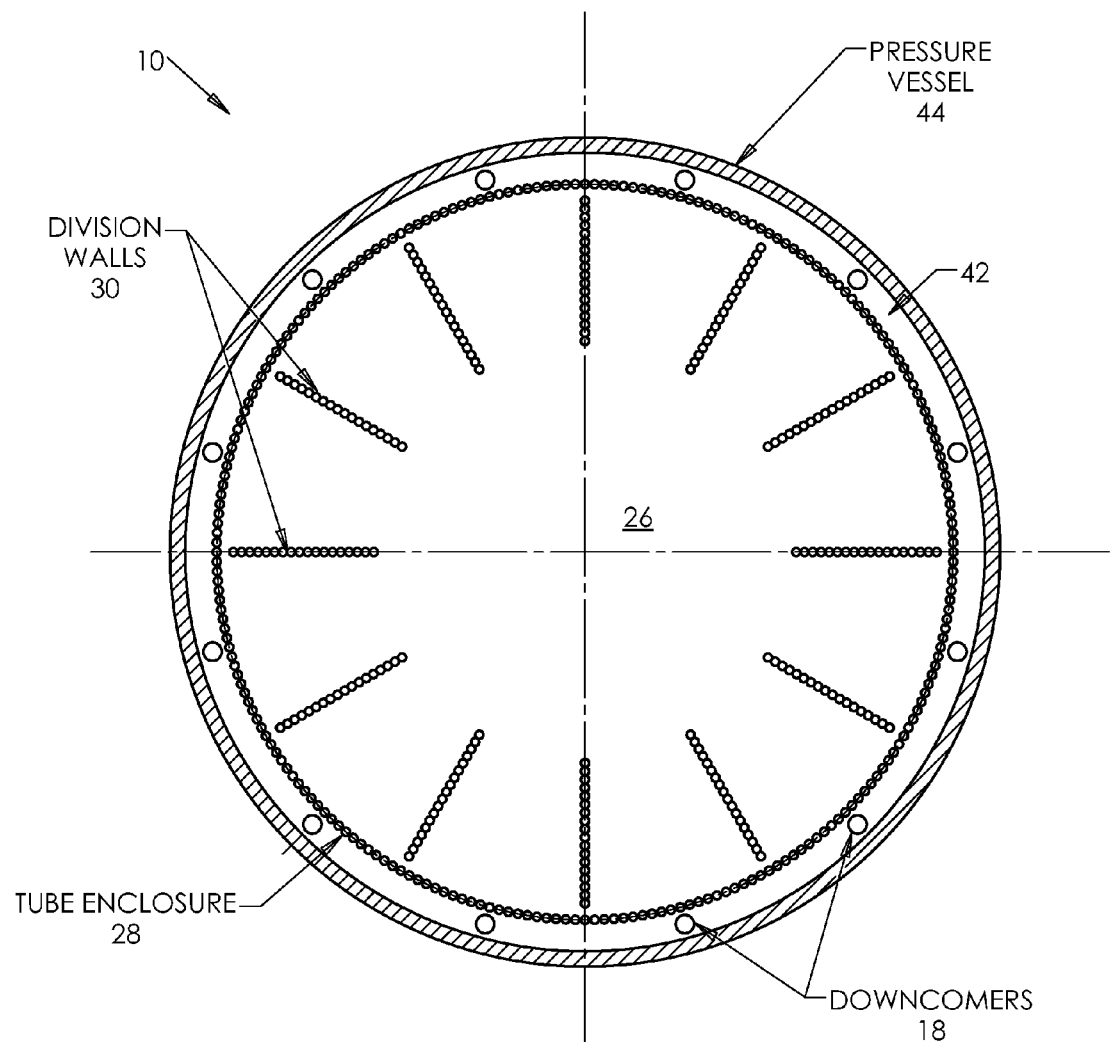
FIG. 8 is a sectional view of FIG. 6 viewed in the direction of arrows 8-8 of FIG. 6.
Figure 9:
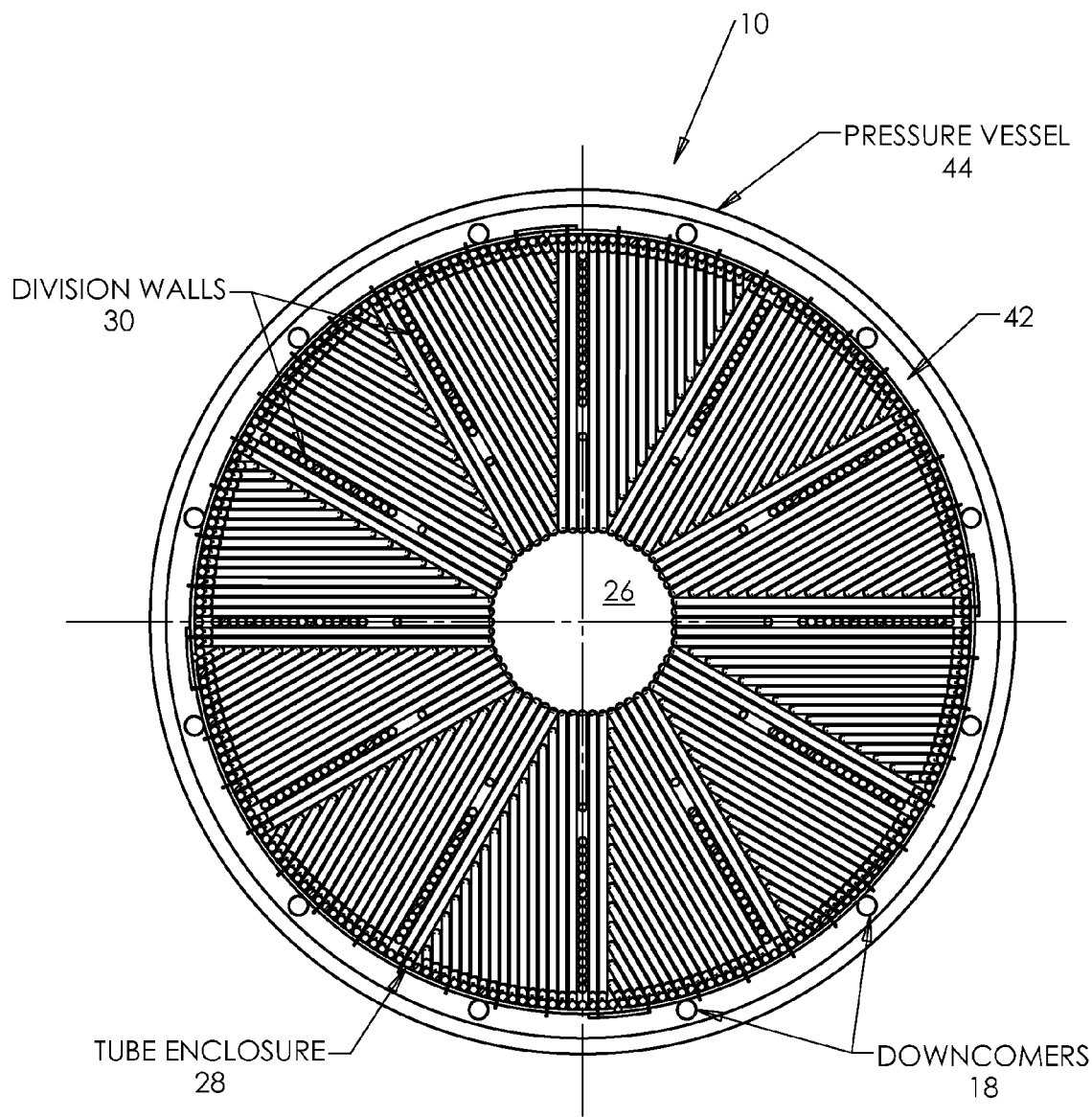
FIG. 9 is a sectional view of FIG. 6 viewed in the direction of arrows 9-9 of FIG. 6.

The present invention relates generally to the field of coal gasification and, in particular, to a radiant synthesis gas (syngas) cooler for use in a coal gasification process. In one instance, the present invention relates to a radiant synthesis gas (syngas) cooler for an Integrated Gasification Combined Cycle (IGCC) power plant. In this embodiment, the radiant syngas cooler is used to contain and cool the synthesis gas produced by a coal gasification process used in the IGCC power plant.

As used throughout the specification and claims, the terms "division wall(s)" and "radial platen(s)" are interchangeable.

Before providing a description of the various embodiments of the present invention, a brief discussion of the various factors and design criteria for proper radiant syngas cooler design will be provided.

The primary function of a radiant syngas cooler is to cool hot synthesis gas produced by a gasification process. A robust, cost effective design is necessary. Determining the proper amount of heat transfer surface is thus an important first step because it is the primary driver for the entire product configuration. Given that the synthesis gas provided to the syngas cooler is at extremely high temperatures, radiation heat transfer phenomena predominates for a significant portion of the syngas cooler, but convective heat transfer effects cannot be ignored, especially as the synthesis gas is cooled to lower temperatures.

Heat Transfer Methods—Determining the heat absorption by the steam-water pressure parts is the single most important criteria to operational success. The gas temperature drop across the syngas cooler is directly related to the steam flow. Heat absorption is related to the synthesis gas properties at high pressure (emissivity in particular), entrained solids, and surface arrangement and cleanliness.

Unique Characteristics of Gasifier Synthesis Gas—The products of combustion in a gasification system are significantly different from those produced by normal boilers operating at atmospheric pressure and using air as an oxidant. These differences occur because:
 (i) combustion is grossly incomplete; approximately 0.4 stoichiometry;
 (ii) large amounts of solids (ash, char) will be entrained;
 (iii) furnace operating pressure is high; and
 (iv) fuel oxidant is pure oxygen versus air.

The synthesis gases formed thus have greatly different properties from normal boiler flue gases. Synthesis gases are high in carbon monoxide, hydrogen and entrained solids, and low in nitrogen and oxygen. Non-negligible amounts of hydrogen sulfide are present, which is important for corrosion considerations. The synthesis gas density is relatively high because of the high gas side operating pressure. The synthesis gas molecular weight is relatively low because of the high hydrogen content. Taken together, the net effect is that the synthesis gases produced have fluid properties (specific heat, enthalpy, thermal conductivity, density, and emissivity) that differ markedly from normal boiler flue gas.

As a result of these different fluid properties, the thermal performance calculation procedure for synthesis gases deviates from an atmospheric pressure boiler in four major areas, as follows:
 (1) The convective heat transfer rate increases by 40 to 70%.
 (2) The radiation heat transfer rate increases.
 (3) The gas side draft loss is different.

(4) The temperature response to a BTU of heat transfer is less. Specific heat and heat content increases, particularly because of the large hydrogen content (hydrogen has a specific heat of about 3.54 BTU/lb-° F. at 1000° F.).

Of these four areas, the radiant heat transfer and the effects of entrained solids are the most significant in setting surface in the radiant syngas cooler. In addition, the highly reducing environment lowers the ash melting point temperatures as compared to oxidized combustion and this can affect the extent of slag covering on the enclosure walls.

Radiative Properties of Particle-Gas Mixtures—The prediction of radiative properties of particle and gas mixtures is a complex but essential step in the design of a radiant syngas cooler. Proprietary computer programs are required. These include programs such as the RPGT computer program for predicting gas properties based on the exponential wide band model from the University of Iowa, and the MIE computer program from IMB Corporation which is based on Mie Theory and which can be used for predicting spectral particle properties. Another proprietary computer program called the Radiative Properties of Particle-Gas Mixtures (RPPGM) program permits fast, efficient access to radiative gas properties and implements the results of the MIE computer program for particle properties.

The RPPGM program can be used in conjunction with another heat transfer program to predict overall furnace or cooler absorption. RPPGM predicts radiation properties for given mixtures of particles and gases. Traditionally, the definition of emissivity does not apply when a medium is partly scattering. Radiative intensity along a path is no longer a function of length, but is also dependent upon the radiation scattered from and into the direction of the path. However, for ideal conditions, an effective (adjusted) emissivity has been defined and is used in RPPGM, which attempts to include particle scattering. The assumption used to evaluate the effective emissivity are valid for moderately thick ($\beta L=1$) to optically thin media ($\beta L \rightarrow 0$), for radiative equilibrium or for cases which scattering is small. Here $\beta$ is the extinction coefficient and L is the beam length.

For the optically thick media typically encountered in gasifier applications ($\beta$=5 to 70), zone type methods, which use emissivity to calculate radiative heat transfer, are not suitable for calculating the effects of particle scattering. Flux type methods or ray tracing methods are then necessary to quantify radiative transfer accurately. The discrete ordinates method is one such approach, which is utilized in The Babcock & Wilcox Company's (B&W's) proprietary computational fluid dynamics (CFD) computer program, COMO™. This method uses radiative absorption and scattering coefficients instead of emissivity for gas-solid radiative transfer. These coefficients are also calculated by the RPPGM program and are more reliable for optically thick media.

Initial estimates of the required amount of heat transfer surface and predictions of the heat transfer surface performance can be can be approximated using an adjusted emissivity method. However, final heat transfer surface requirements should be based upon CFD modeling techniques and programs such as COMO™.

CFD Modeling of the Radiant Syngas Cooler—CFD models are typically based on a fundamental description of various interacting processes of turbulent flow, chemical reaction, and heat transfer. B&W's COMO™ computer program was specifically developed for the design and evaluation of combustion systems (boilers, furnaces, and burners), and has previously been used in the design of high-pressure, oxygen- and air-blown, entrained flow gasifiers. The COMO™ model is used for predicting the gas-side heat transfer performance of the radiant syngas cooler. Coal combustion is simulated with advanced models for coal devolatilization and char oxidation and gasification. Particle flow is predicted using a combination of numerical methods (Lagrangian for large particles, Eulerian for small particles) to predict particle aerodynamics, turbulent dispersion, and deposition on heat exchanger surfaces. Radiation heat transfer is solved in combination with turbulent flow, energy, and combustion. Predictions of gas-particle flow, temperature and heat flux are thus available for the design of the radiant syngas cooler.

Numerical modeling is the most accurate approach for predicting radiation transfer in the densely absorbing and scattering media that is ubiquitous in coal combustion and gasification systems. The COMO™ model uses the discrete ordinates method for numerical analysis of radiation in combustion systems, and incorporates the complex geometrical description of the combustor (cooler enclosure and division walls). Discrete ordinates was developed and optimized for thermal radiation in multi-dimensional geometries by the pioneering work at B&W. Since then, it has gained in popularity, and is now used in many other commercial CFD codes. The numerical solution for radiation leads to the distribution of radiant intensity and radiant heat flux for a given temperature field. The solution is coupled to equations for conservation of energy, and relationships for temperature and thermodynamic properties of gases and particles. Wall temperatures are determined from an energy balance for convection and radiation heat transfer to the surface, mass transfer, and heat conduction through the deposit-covered water-cooled surfaces. A numerical solution for radiation, gas and particle energy, gas and particle temperatures, and wall temperature will ultimately yield a converged solution in which an overall energy balance is achieved.

Combustion gases and entrained particles have a significant role in radiation heat transfer because they absorb, emit, and scatter radiation. Radiation properties of gases are accurately predicted based on fundamental models for spectral gas radiation. The exponential wide band model is used to calculate spectral absorption and emission properties of gas mixtures with $H_2O$, $CO_2$, $CO$, $CH_4$, $NO$ and $SO_2$, and non-participating gases $N_2$, $O_2$, and $H_2$. Mie theory is a general method for calculating radiation properties of spherical particles as a function of particle composition, concentration, diameter, and wavelength. These methods require reliable estimates or measurements of the composition, concentration, and particle size distribution of entrained particulate (char, ash and soot) entering the reactor. Radiation properties of the gases and particles are combined and conveniently expressed as total emission, absorption, and scattering efficiencies that depend on local variations in gas-particle composition, temperature and pressure. These properties are incorporated into the numerical method for radiation heat transfer. When particles other than soot are involved, particularly for the dense particle loading expected in the radiant syngas cooler, the effects of scattering cannot be neglected. Numerical methods which solve the general form of the radiative transport equation include the effects of both scattering and absorption.

The emissivity and thermal properties of ash deposits also have a large effect on heat transfer. The emissivity depends on the temperature, chemical composition, structure and porosity of the deposit layer, and whether the deposits are partially fused or molten. The thermal and radiative effects of coal-ash deposits can be included in the COMO™ model based on a combination of experimental measurements, and experience with boiler heat transfer performance. Because methods for predicting the effects of slag build up on heat transfer surfaces are partly empirical, they should be calibrated with field measurements of radiant syngas cooler performance at operating radiant syngas cooler units.

Heat Transfer Surface Setting—As described above, an adjusted emissivity method can be used to determine gas radiation heat transfer coefficients and empirical surface fouling factors to calculate the required amount of surface. Surface cleanliness plays an extremely important role in determining heat absorbed, and can be difficult to predict. Fouling factors are typically based on empirical values determined from experience with fuels, operating conditions and surface arrangement. Surface is set to absorb the specified heat input provided by the synthesis gas to be provided to the radiant syngas cooler under normal operating conditions. The heat transfer media is water. The water receives the heat from the synthesis gas and, based upon an assumed feed water temperature and a given heat input will generate a steam flow according to known thermodynamic principles.

The heat transfer surface design should be based on achieving the required absorption without the use of soot blowers to clean the heat transfer surface of deposits which will accumulate during operation. Based upon experience at current gasification units, an equilibrium fouling and absorption rate is achieved over time. The present inventors have noted that such equilibrium conditions are also attained in industrial and utility boilers firing similar fuels, and the performance of such boilers is quite manageable. Experience indicates that due to slag buildup on soot blowers during service, penetration of corrosive gases, and breakdown of seal systems in-gas stream, removable soot blowers are unacceptable from a practical maintenance and availability standpoint. Wall blowers that do not project into the gas stream are effective for walls but are not typically used to blow outward onto surface like division walls, where most of the slagging occurs. Using this type of blower without access through the vessel wall would help solve some problems. However, extensive piping would be required in the inaccessible annulus and this piping would still be prone to attack by corrosion products.

To establish credible fouling factors, baseline calculations can be made from publicly available information on performance of the current radiant syngas coolers. It is well known that the heat transfer performance of these existing radiant syngas coolers has been much better than expected, due in large part to less than expected surface fouling. Surface configuration can be modeled and surface fouling factors back calculated to match performance; however, for full load coal-firing conditions, relatively low radiant cooler exit temperatures have resulted in relatively "clean" fouling factors when compared to the present inventors' experience with industrial and utility boilers. Recent experience with coal and petroleum coke mixtures at these units indicate "dirtier" fouling factors than achieved during "coal only" firing. It will thus be appreciated that the selection of appropriate fouling factors must be made based upon the fuels to be fired and, if available, actual field data.

Since fabrication of the radiant syngas cooler vessel will typically occur off-site, the vessel outer diameter is typically set to accommodate maximum shipping limitations. By expanding the tube enclosure out close to the outer wall of the pressure vessel and maximizing the use of internal division wall surface, an efficient design can be obtained. The height of the radiant syngas cooler is then set using appropriate surface fouling factors (as described above) and then solving the equations to determine the amount of heat transfer surface that will absorb that amount of heat necessary to achieve a desired exit synthesis gas temperature. The temperature of the synthesis gas decreases in non-linear fashion with distance from the radiant syngas cooler inlet. Declining radiation heat transfer driving force can be expected at the cooler exit, where significant additional radiant syngas cooler height would be needed to achieve only extremely modest reductions in synthesis gas temperature (e.g., for a given arrangement, an additional ten feet of radiant syngas cooler height may only be able to achieve an additional 50° F. reduction of synthesis gas temperature). Increases in surface fouling factors would shift this relationship still further, and thus a more conservative assumption about fouling requires addition of substantial height and cost. Provision can be made for field addition of contingency surface, but it provides limited coverage due to declining effectiveness with height. It is evident that installation of more effective surface can achieve a proportionally shorter vessel.

Referring to the drawings generally, wherein like reference numerals designate the same or functionally similar elements throughout the several drawings, and to FIGS. 1 and 2 in particular, there are shown perspective views of a known radiant syngas cooler (RSC), generally designated 10. RSC 10 is typically a cylindrical vessel having its longitudinal axis oriented vertically. RSC 10 is provided with hot synthesis gas 12 from a gasifier (shown in phantom in FIG. 1 and omitted for clarity in FIG. 2) at a synthesis gas inlet 14 provided at the top of RSC 10. RSC 10 is provided with supports 5 which transmit the load of RSC 10 to adjacent support steel (not shown). As described later, RSC 10 extracts heat from the synthesis gas 12 by means of fluid-cooled surfaces located within RSC 10. These fluid-cooled surfaces are comprised of tubes and the working fluid within the tubes may be water, steam or a mixture thereof. A steam drum 16 is provided adjacent the upper portion of RSC 10 and is in fluidic communication with the fluid-cooled surfaces within RSC 10. More particularly, large pipes known as downcomers 18 are fluidically connected to the bottom portion of drum 16 and convey sub-cooled water from drum 16 to the fluid-cooled surfaces within RSC 10. Heat extracted from the synthesis gas 12 causes the water in the fluid-cooled surfaces to become steam. Circulation is established through the difference in fluid density between downcomers 18 and the heated fluid-cooled surfaces, thereby inducing the natural circulation process well known to those skilled in the art. In other words, the fluid-cooled flue and radiant heat transfer surfaces within RSC 10 are designed so that the heat extracted from the synthesis gas 12 during normal operation of synthesis gas cooler 10 is sufficient to induce natural circulation through the fluid-cooled flue and radiant heat transfer surfaces.

The lower density water/steam mixture is conveyed up through the fluid-cooled surfaces and then out of RSC 10 via risers 20 back to steam drum 16. Conventional steam/water separation devices (not shown) within steam drum 16 are used to separate the water from the steam. The saturated steam exits from saturated steam outlet connections 22 on the top of drum 16. The separated water is mixed with incoming feed water supplied via a feed water connection 24 and the process is repeated.

A full disclosure of steam drums specifically and boilers in general can be found in *Steam/its generation and use,* 41st Ed., Kitto & Stultz, Eds., ©2005 The Babcock & Wilcox Company, the text of which is hereby incorporated by reference as though fully set forth herein.

Referring to FIGS. 3, 4 and 5, there are shown perspective views, partly in section, of RSC 10 of FIG. 1. The gas 12 enters a flue or enclosure region 26 provided within RSC 10. Flue 26 is defined by an enclosure wall 28, preferably approximately cylindrical in shape, and comprised typically of fluid-cooled tubes which convey a working fluid which may be water, steam or a mixture thereof as indicated earlier. In addition to the fluid-cooled tubes forming enclosure wall 28, flue 26 is also provided with a plurality of radiant, fluid-cooled division wall surfaces 30 which are internally suspended within RSC 10 so that a significant portion of division wall surfaces 30 are exposed to the incoming synthesis gas 12, thereby heating the working fluid (again, water, steam or a mixture thereof) conveyed through division walls 30.

Division walls 30 are generally constructed as a planar bank of tubes provided adjacent to one another, and may be provided with inlet and outlet manifolds or headers 32 which distribute or collect the working fluid conveyed through the division walls 30. The number and arrangement of the division walls 30 provided would be determined by heat transfer and cooling requirements as described above. Thus while FIGS. 3, 4 and 5 may suggest an arrangement of 12 division walls 30, arranged around the vertical longitudinal axis of the RSC 10, a greater or fewer number of division walls 30 may be provided to suit particular heat transfer and cooling requirements.

Referring now to FIGS. 6, 7, 8 and 9 there is shown a first embodiment of the RSC 10 according to the present invention. As shown, the hot synthesis gas 12 enters through synthesis gas inlet 14 located at a top of the RSC 10. The hot synthesis gas 12 is conveyed downwardly through the flue 26 where the flue enclosure walls 28 and radiant heat transfer surface (division) walls 30 extract heat from the gas 12, reducing the latter's temperature. The bottom portion of the flue 26 is provided with hopper means 46, preferably frusto-conical in cross section and having a throat 48. The hopper means 46 collects slag particles and directs the hot synthesis gas 12 downwardly towards the water bath region 34 at the lower portion 52 of the RSC 10. The water bath region 34 is typically filled with water during operation, and serves to quench and humidify the hot synthesis gas 12 before it exits from the RSC 10 via synthesis gas outlet 38. The water bath region 34 is also for receiving and cooling solids entrained in the synthesis gas 12 and is provided with a solids outlet 54 for removing the solids from the RSC 10.

Means are also provided for conveying the synthesis gas 12 from the hopper means 46 to the water bath region 34, advantageously in the form of dip tube means 56 which extends from the throat 48 of the hopper means 46 to the water bath region 34. The lower or outlet end 58 of the dip tube means 56 is located proximate the water bath region 34 and is preferably below the surface of a water level established in the water bath region 34 during RSC 10 operation.

In order to prevent the hot and corrosive synthesis gas 12 from getting "behind" the flue enclosure walls 28, seal plate means 64 are provided within the RSC 10 for preventing the synthesis gas 12 from entering an annular region 42 between the vessel shell 44 and the flue enclosure walls 28. The seal plate means 64 typically extends between the shell 44 and means for conveying the synthesis gas 12 from the hopper means 46 to the water bath region 34 (i.e., between the shell 44 and the dip tube means 56. Together the shell 44 and the seal plate means 64 partially define the synthesis gas outlet region 36. As described earlier, the synthesis gas outlet region 36 conveys synthesis gas 12 from the water bath region 34 to the synthesis gas outlet 38.

Expansion joint means 66 are provided for accommodating relative movement between the seal plate means 64 and the hopper means 46. Expansion joint means 50 for accommodating relative movement between the shell 44 and at least one of the fluid-cooled flue enclosure walls 28 and fluid-cooled radiant heat transfer surface 30 are also provided.

The hot synthesis gas is still at an elevated temperature upon exiting the throat region 48 of the hopper means 46, typically in the range of 1250° F. In order to cool and humidify the hot synthesis gas 12, quench means 68, advantageously in the form of at least a single quench ring 68, are provided for injecting fluid (e.g., water) into the synthesis gas 12. During operation of the RSC 10, hot synthesis gas 12 enters the dip tube 56 where it is partially quenched and the temperature is reduced from a typical 1250° F. temperature to a lower temperature in the range of approximately 950° F. Single or multiple quench spray level elevations 68 can be employed.

Figure 10:
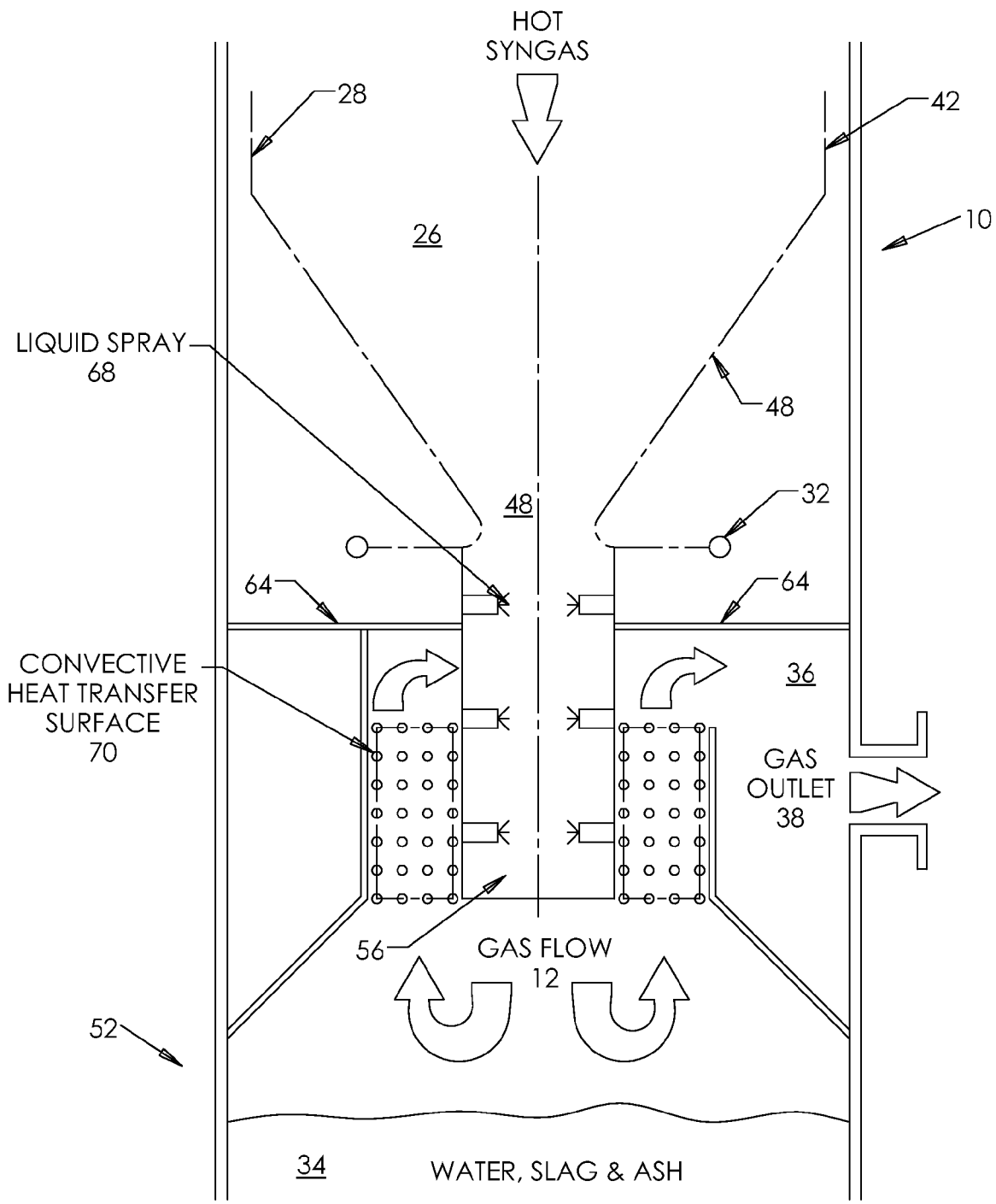
FIG. 10 is a partial sectional side view of a second embodiment of a radiant syngas cooler illustrating placement of convection heat transfer surface in a lower portion of the radiant syngas cooler according to the present invention.

As shown in FIG. 10, a second embodiment of the RSC 10 according to the present invention is disclosed, and which involves the placement of convection heat transfer surface 70 adjacent the dip tube means 56 in order to extract additional heat from the synthesis gas 12 prior to conveying the synthesis gas 12 through the synthesis gas outlet 38. Advantageously, the convection heat transfer surface 70 comprises one or more banks of tubes arranged so that the synthesis gas 12 flows over the outside of the tubes. This convection heating surface 70 can be water or steam cooled. The banks of convection heating surface 70 may be provided anywhere around the perimeter of the dip tube means 56 and the tubes may be in any orientation. The convection heating surface 70 may employ the same fluidic circuitry (an integrated cooling approach) as is employed in the steam generating surface comprising the flue walls 28 and radiant heat transfer surfaces 30, thus eliminating the need for a separate cooling system. Alternatively, a separate fluidic circuit may be employed for the convection heating surface 70. The main objective is to transfer heat from the synthesis gas 12 so that the ash has a reduced tendency to stick to the tubes and cause deposition and plugging. With a direct spray quench system 68 upstream in the dip tube means 56, the synthesis gas 12 temperature can be reduced at the bottom of the RSC 10 below levels where convection cooler inlet plugging has traditionally been problematic. The quench system 68 can also be designed to promote solids dropout. Placing surface in this region to meet specified heat absorption reduces heat transfer surface cost and risk. Displacing 15% to 20% of the specified radiant heat transfer duty could reduce radiant surface and vessel height by as much as 40%. Convective surface 70 would be steam-water cooled, and is compact and cost effective in the required temperature range of approximately 700° F. to 1000° F. Additional heat absorption beyond that typically considered achievable in a radiant cooler may be feasible, enhancing overall plant efficiency. Convective surface 70 also acts as a buffer against swings in RSC 10 outlet gas 12 temperature, reducing sensitivity of the design to surface fouling in the RSC 10.

Tube Wall Construction and Metal Temperatures—In a preferred embodiment, the tubes forming the enclosure wall 28 are of membrane construction with 2" OD tubes of relatively thin wall thickness and narrow spacing. Tube diameter and spacing are set based on maximum metal temperatures to avoid corrosion with high chrome/nickel alloy material, which has a thermal conductivity approximately ⅓ that of carbon steel. The greatly reduced conductivity yields high tube OD and membrane temperatures. The upset spot absorption rate is set at 100,000 BTU/ft2 hr based on an average expected absorption rate in the highest temperature zone of 68,000 BTU/ft2 hr. For a 2" diameter tube operating at relatively high steam pressure, the maximum outside tube and membrane temperatures are approaching 800 F. The membrane width chosen is a minimum which can be manufactured with conventional membrane weld techniques. The tube ID and water saturation temperatures are desired to be higher than existing units to improve steam cycle efficiency. Scale up from existing unit steam operating pressure tightens the margin for corrosion protection based on minimizing the tube temperature.

The design of the division walls 30 preferably incorporates loose tube construction with each panel approximately 3 feet wide using 2" OD tubes. There is a small gap between the tube enclosure wall 28 and the division walls 30. The division walls 30 receive heat on two sides and the absorption is thus twice that of the tube enclosure wall 28. The maximum tube OD temperature is not significantly affected by the higher absorption and is similar to the enclosure wall 28 tubes. At minimum membrane widths, the membrane temperature is unacceptably high from receiving heat on two sides. Tangent tube construction and full weld between the tubes to form a tangent tube panel may also be considered, as well as a full length weld of the division wall 30 to the enclosure wall 28.

Circulation System Design—The circulation system must accommodate fast ramp rates of heat input during start-up. The steam drum 16 diameter and length are established based upon steam flow and drum swell requirements. Once the flue 26 tube enclosure wall 28 and division wall 30 tube sizes and quantities are set by the surface arrangement, water flow areas are calculated, a circulation ratio is established and connection sizes are set to provide acceptable water velocity, percent saturated water head, top steam quality and stability in all circuits. Natural circulation is preferred due to its self-regulating capability and reduced operating costs since there are no pumps to operate and maintain. However, as will be observed in FIG. 2, the possibility of employing circulating pumps 40 is considered. In addition, under certain circumstances there may be a need for a smaller circulation pump for startup that is shut off and isolated when the heat input is steady. During startup, steam from an outside source is introduced to the steam drum to raise pressure and temperature of the pressure parts during the gasifier temperature rise. Once the gasifier temperature is sufficient to ignite the coal, it is necessary that the pressure parts are uniformly warmed from circulated water. Because the heat to raise pressure is introduced at the top of the circulation circuit, there is no driving force for water to circulate, hence the possible need to either introduce the steam at the bottom of the circulation circuit or to add small circulation pumps to force circulation. Once circulation is established, the instantaneous ignition of coal at a high heat input can be safely accommodated and the start-up circulation pump shutdown and isolated.

The drum 16 location and connection design is set to accommodate circulation and a reasonable placement of this equipment in the steel surrounding the RSC 10. At the top of the RSC 10, downcomer pipes 18 from the drum 16 enter the top of the RSC 10 vessel and extend to the bottom of the RSC 10 through the annulus 42 created between the vessel wall 44 and the tube enclosure wall 28. This arrangement simplifies vessel connections and supply routing.

Additionally, a steam warm-up system in the steam drum 16 (not shown) may be provided to preheat the entire steam-water system prior to gasifier light-off, using the circulation pumps 40 to heat the setting.

Syngas Sealing—The primary gas seals required to protect the RSC 10 vessel wall 44 and the pressure parts not in direct contact with raw syngas 12 are at the gas inlet 14, at the enclosure wall 28 roof and at the gas outlet 38 downstream of the quench system 68. At the gas inlet 14, hot gas bypassing behind the refractory and overheating of the vessel 44 at this highly stressed area must be prevented. This is accomplished by encasing the refractory neck 78 above the pressure parts with a gas tight metallic expansion joint 50 and pressurizing the inside with nitrogen and/or clean recycle syngas. At the roof, a gas tight construction through direct pressure part closure and/or use of closure plates above the pressure parts away from the radiation from the furnace is employed. At the gas outlet 38, a tight closure plate from vessel wall 44 to dip tube means 56 is provided, with a metallic expansion joint 66 to accommodate relative movement between the walls 28 and vessel wall 44. A tight seal prevents saturated syngas 12 from contacting the pressure parts and vessel above the cladded area.

Tight syngas seals are preferred in the region of the RSC 10 outlet 38 to keep raw syngas 12 from contacting areas of the pressure vessel and heat transfer pressure parts that are not designed with materials to resist corrosion. There are open spaces between the flue enclosure wall 28 and vessel wall 44 that are purged with nitrogen or clean, recycled (non-corrosive) syngas under normal operating conditions to keep raw syngas out. The gasification process introduces significant pressure transients during upset conditions that would subject the seal to extreme pressure differences and cause failure of the seal, or even the pressure parts in a worst case. The seal approach described above must also allow for pressure relief of raw synthetic gas 12 during positive or negative synthetic gas 12 transients to prevent damage to the flue enclosure wall 28.

Reduce Fabrication Cost/improve Panel Welding—Significant attention to weld quality is critical when fabricating and welding with expensive and difficult-to-work with high chrome/nickel tube alloys. It is envisioned that laser welding of the boiler tube wall panels employed in the RSC 10, according to the methods as described in U.S. Pat. No. 6,852,945, can provide significant cost reduction potential, the text of which is hereby incorporated by reference as though fully set forth herein. This technique reduces the need for expensive alloy weld wire to just that needed for making conventional manual panel welds, and reduces labor man hours in panel fabrication. It also offers a stronger and lower heat input panel weld, with obvious advantages, especially in the fabrication of the membrane to tube welds. Automatic panel welding can be used for the vertical cage tube panel sections of the radiant syngas cooler, and potentially for the division wall panels. Base metal sensitization will be minimized by laser welding to a degree that is unachievable with submerged arc welding. With heat inputs of 3 to 5 kilojoules per centimeter, the heat affected zone is much smaller and it penetrates less into the tube wall.

Optimize Heat Transfer Surface—The diameter, height and weight of the vessel are primary cost drivers across all project costs: raw material, fabrication, transportation and erection. Mitigating the surface fouling risk requires maximizing surface cleanliness and installing more surface in a given volume.

Maximize Surface Cleanliness—The key to optimizing surface effectiveness is minimizing the accumulation of molten slag on division walls 30 in the upper region of the RSC 10. The temperature driving force is greatest at the top but molten ash significantly reduces heat transfer, and gas temperature is not safely below the ash fusion point at equilibrium until nearly half way down the height of the cooler.

Accordingly, another embodiment of the present invention involves the use of an appropriate contour of the refractory at the synthesis gas inlet 14 to control gas expansion exiting the inlet 14. In particular, a parabolic (or other favorable) cone-shaped inlet is provided at a top portion of the RSC 10 for admitting the synthesis gas 12 into the RSC 10 such that solids entrained within the synthesis gas 12 are preferentially directed downwardly in order to reduce direct impact of the entrained solids on the fluid-cooled radiant heat transfer surface 30. This allows the particle laden synthesis gas 12 to expand within the cone and reduce the potential for flow induced vortices. This should minimize the outward flow of molten ash particles and keep the division walls 30 cleaner.

Another embodiment of the present invention involves means to reduce slagging potential by moving the leading edge of division walls 30 further from the longitudinal vertical centerline of the RSC 10. This will require, in most instances, a greater quantity of reduced-depth division walls 30. The radiant heat transfer surface 30 furthest from the centerline is the cleanest; thus moving more of the division wall surface 30 towards the flue walls 28 should make this surface cleaner and more effective. The concept is to contain the molten ash flow more axially and move the division walls 30 further outboard. This combination increases the potential for cleaner surfaces compared to existing units, even in the slag zone. Thus, the fluid-cooled radiant heat transfer surface 30 partially extending within the flue 26 for cooling the synthesis gas 12 is located so as to reduce direct impact of the synthesis gas 12 and solids entrained therein onto the fluid-cooled radiant heat transfer surface 30.

Enhance Surface/Volume Efficiency—Enlarging the flue 26 diameter by removing the downcomer supply pipes in the annulus 42 would provide an opportunity to increase in surface. This advanced design concept would require connecting downcomer pipes 18 entering at the top of the vessel to a ring header just above the tube wall 28 perimeter. A portion of the tubes 28 would be connected to the ring header, with water flow down a portion of the wall tubes 28 into a collection header at the bottom of the wall tubes 28 as a heated downcomer 18 system. The remaining wall tubes 28 and the division wall tubes 30 would connect a lower supply ring header with water flow back up to a riser 20 header and on to the steam drum 16. This construction may also offer advantages in simplifying top support of the wall 28 and division wall 30 assemblies. Thus, another embodiment may employ heated downcomer means 18 and which form part of the fluid-cooled walls 28, the downcomer means 18 being supplied from and supported by a common ring header located at an upper portion of the RSC 10. Experience has shown that heated downcomer circuits are safe and effective when the water exiting the circuit is sufficiently sub-cooled to provide a water boiling point 10 feet or more above the inlet header. Success with this design is driven by the combination of circulation ratio and the amount by which the entering feed water is sub-cooled below saturation temperature.

Another embodiment of the present invention involves contouring the division wall profile to match the pattern of reduced slagging from top to bottom. Each division wall is made about 17% deeper beginning at the midpoint of the cooler by expanding the membrane width between each tube. This region is cooler and less slag-prone, and maximum membrane temperatures can be controlled at larger widths. Each division wall 30 is further expanded about 17% over the last one fourth of the height using incrementally wider membrane. Thus, the one or more planar division wall surfaces 30 have a varying shape in order to reduce slag deposition thereon. Portions of the division wall surfaces 30 which are closer to the synthesis gas inlet 14 are radially further away from a longitudinal axis of the RSC 10, and portions of the division wall surfaces 30 which are closer to the hopper means 46 are radially closer to the longitudinal axis of the RSC 10. Alternatively, the division wall surfaces 30 are provided with a membrane wall construction and the varying shape of the division wall surfaces 30 is provided by varying a width of the membrane in between adjacent tubes forming the division walls 30.

With this combination of increased flue 26 diameter and contoured division walls 30, the amount of installed heat transfer surface is increased approximately 40%. The area increase is achieved using flat membrane bar, which is much less expensive than tubes. The distance from the gas inlet to the leading edge tube of 24 in. deep division walls 30 will be approximately 38 in. Even without taking credit for cleaner surfaces in the slag covered area, the overall height requirement can be significantly decreased.

The use of composite tubes in place of solid high chrome/nickel alloy tubes could offer several cost and risk advantages. Composite tubes would be made of an outer layer of high chrome/nickel alloy over a base tube of Croloy material. As used herein, Croloy is a trademark for metallic tubes, particularly those generally referred to by those skilled in the art as the chromium and molybdenum steels. They fall under the A.S.T.M. designation A 213/A 213 M, or the A.S.M.E designation SA 213, and come in various grades such as T2 (Croloy ½), T5, T9, T11 (Croloy 1¼), T12, and T22 (Croloy 2¼). The composite tubes envisioned in this application would likely be 2½ in. OD, larger than the 2 in. OD with solid high chrome/nickel alloy. Thinner high chrome/nickel alloy material over a conductive base material would lower tube and membrane maximum temperatures, allowing wider membrane in the enclosure and allow for membrane construction of division walls in the high heat flux zone. The larger tube OD and membrane widths would require fewer tubes overall. The higher conductivity would provide more operating temperature margin below maximum allowable metal temperatures. Having Croloy material on the tube ID would also reduce feed water quality requirements and lower capital and operating cost of feed water treatment.

Division Wall, or Radial Platen, Designs—In one embodiment, the present invention is drawn to an arrangement of heat transfer surfaces (i.e., division walls, or radial platens, 30) which improves the heat transfer effectiveness and minimizes the size of a radiant syngas cooler (RSC) without adversely affecting fouling and plugging of the heat transfer surfaces significantly. In another embodiment, the division wall, or radial platen, designs of the present invention can be utilized in a radiant boiler to improve the heat transfer effectiveness and minimize the size of a radiant boiler without adversely affecting fouling and plugging of the heat transfer surfaces significantly.

Given the above, for the sake of brevity the divisional wall, or radial platen, designs of the present invention will be described in detail with respect to RSCs. However, as is noted above, such designs are not limited thereto and can be applied broadly wherever compact heat transfer devices are needed.

Figure 11:
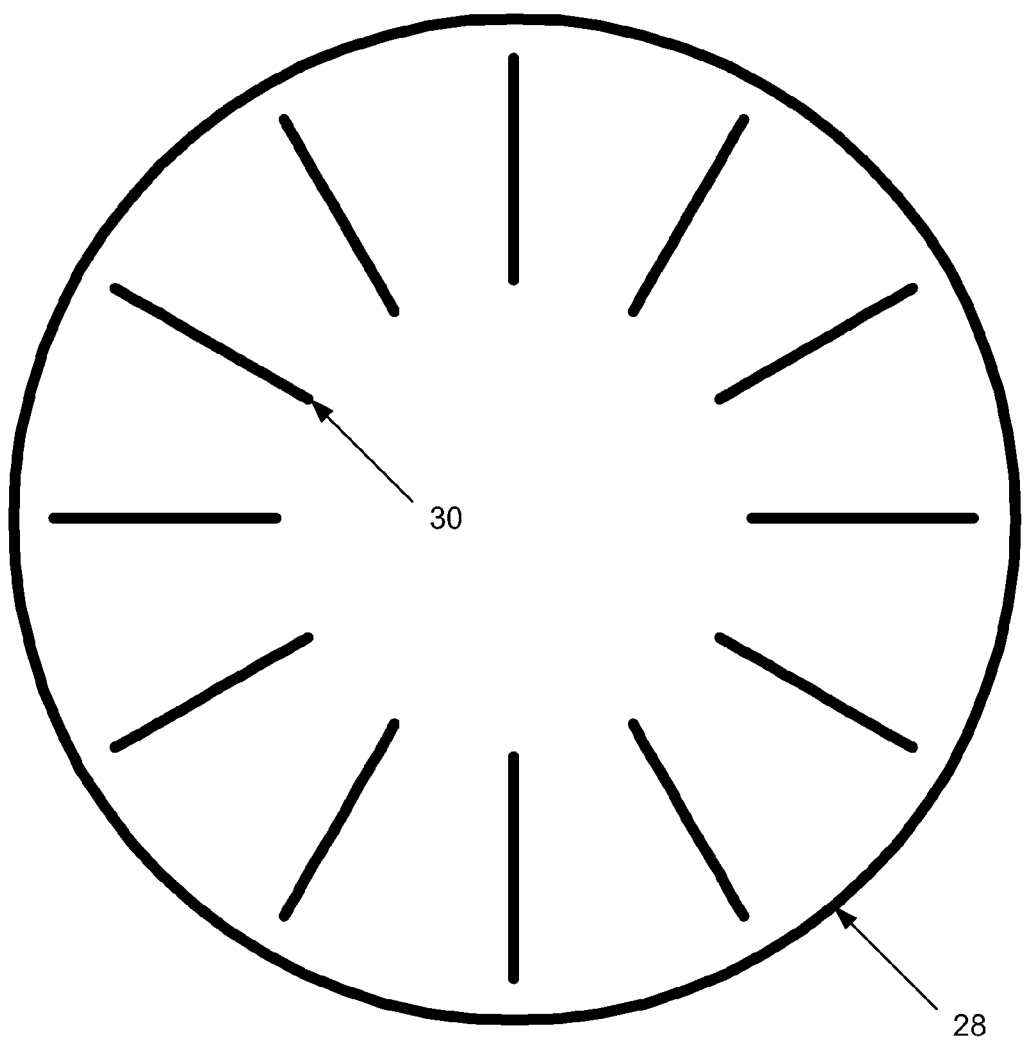
FIG. 11 is a simplified cross-sectional view of one embodiment of a prior art radiant syngas cooler (RSC)
Figure 12:
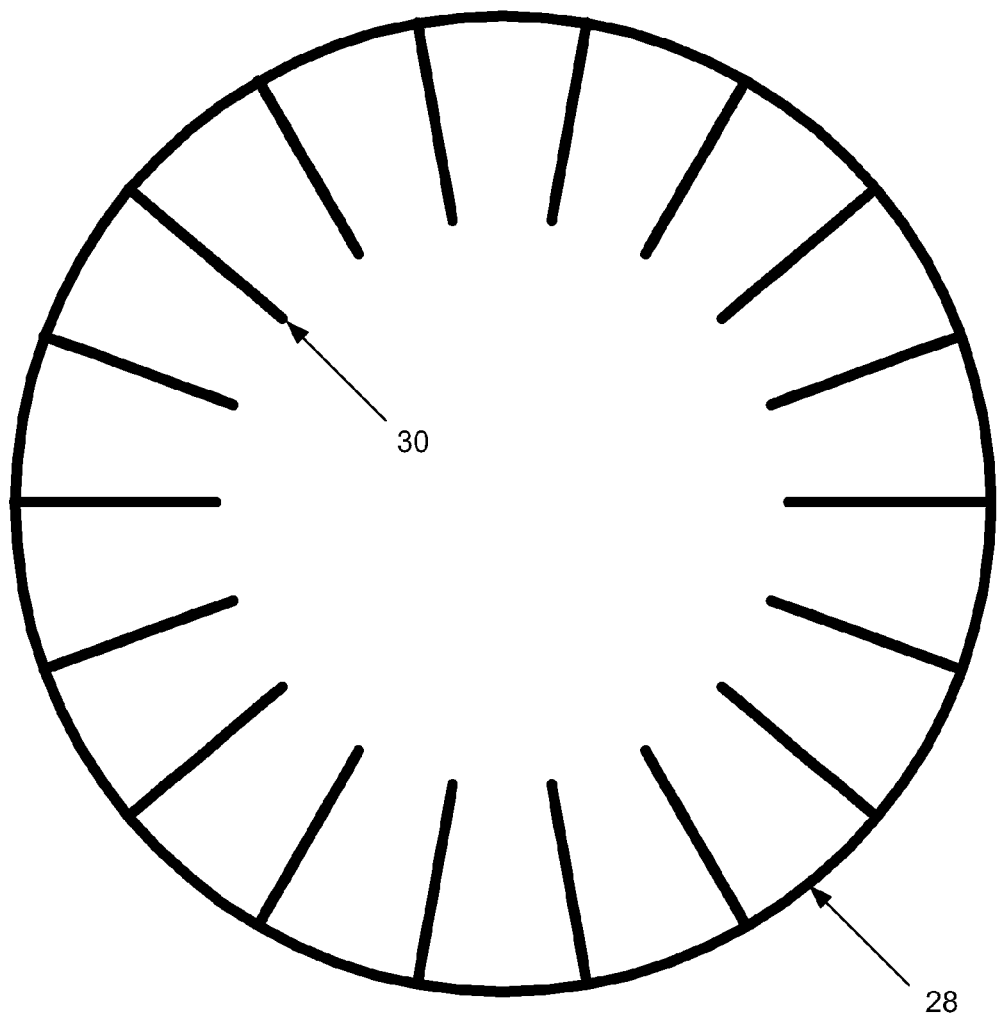
FIG. 12 is a cross-sectional view of another embodiment of a prior art radiant syngas cooler (RSC)

Turning to FIGS. 11 and 12, these Figures illustrate prior art divisional wall, or radial platen, designs. With regard to the prior art designs of FIGS. 11 and 12, these designs suffer from a number of drawbacks including, but not limited to, fouling and plugging issues, serviceability issues, and less efficient heat transfer. Due to the designs of the present invention, RSCs having divisional wall, or radial platen, designs in accordance with the present invention are less likely to foul and/or plug, are easier to service due to better access, and possess higher degrees of heat transfer efficiency.

Figure 13:
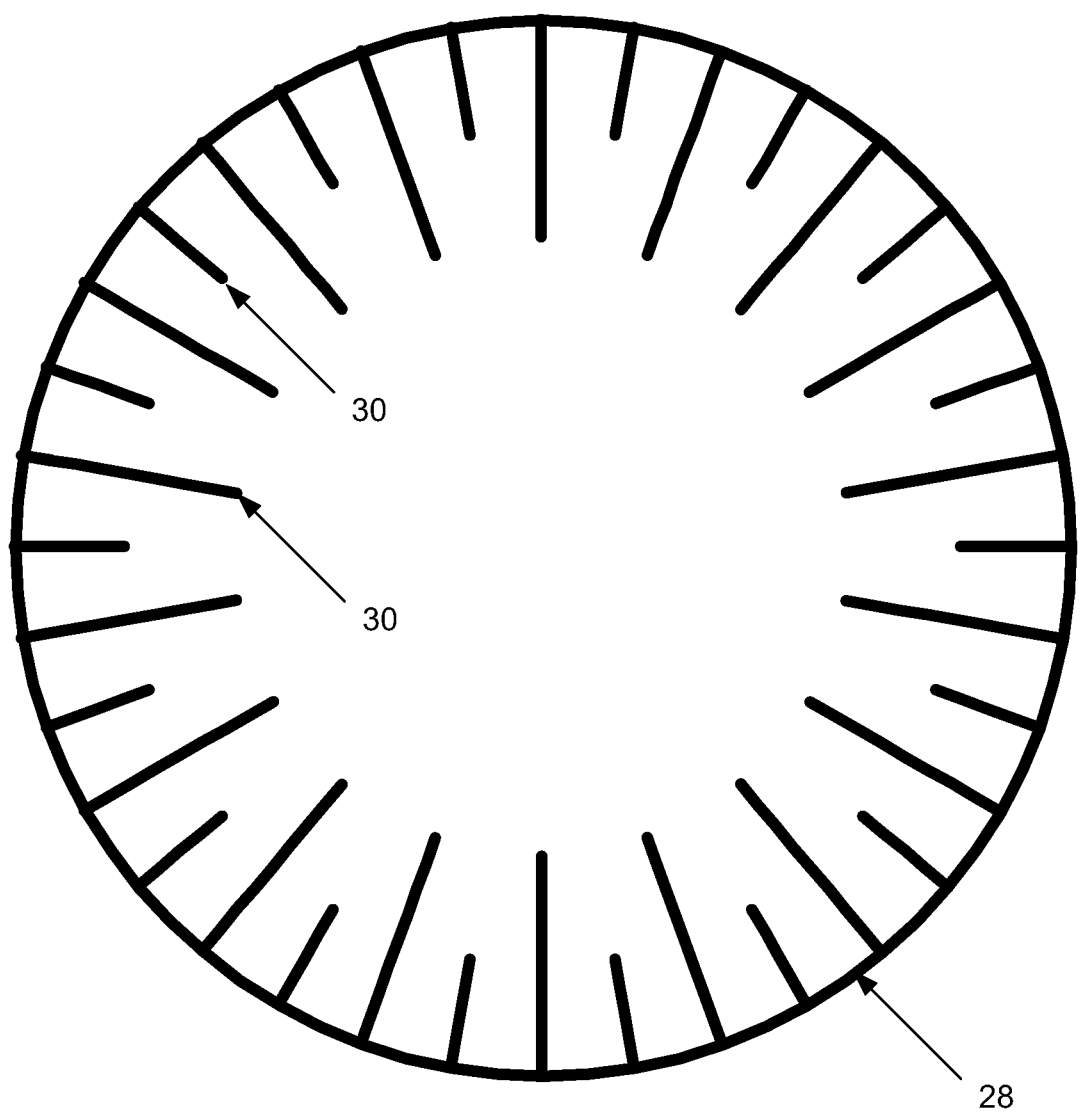
FIG. 13 is a cross-sectional view of a division wall, or radial platen, design in accordance with one embodiment of the present invention.
Figure 14:
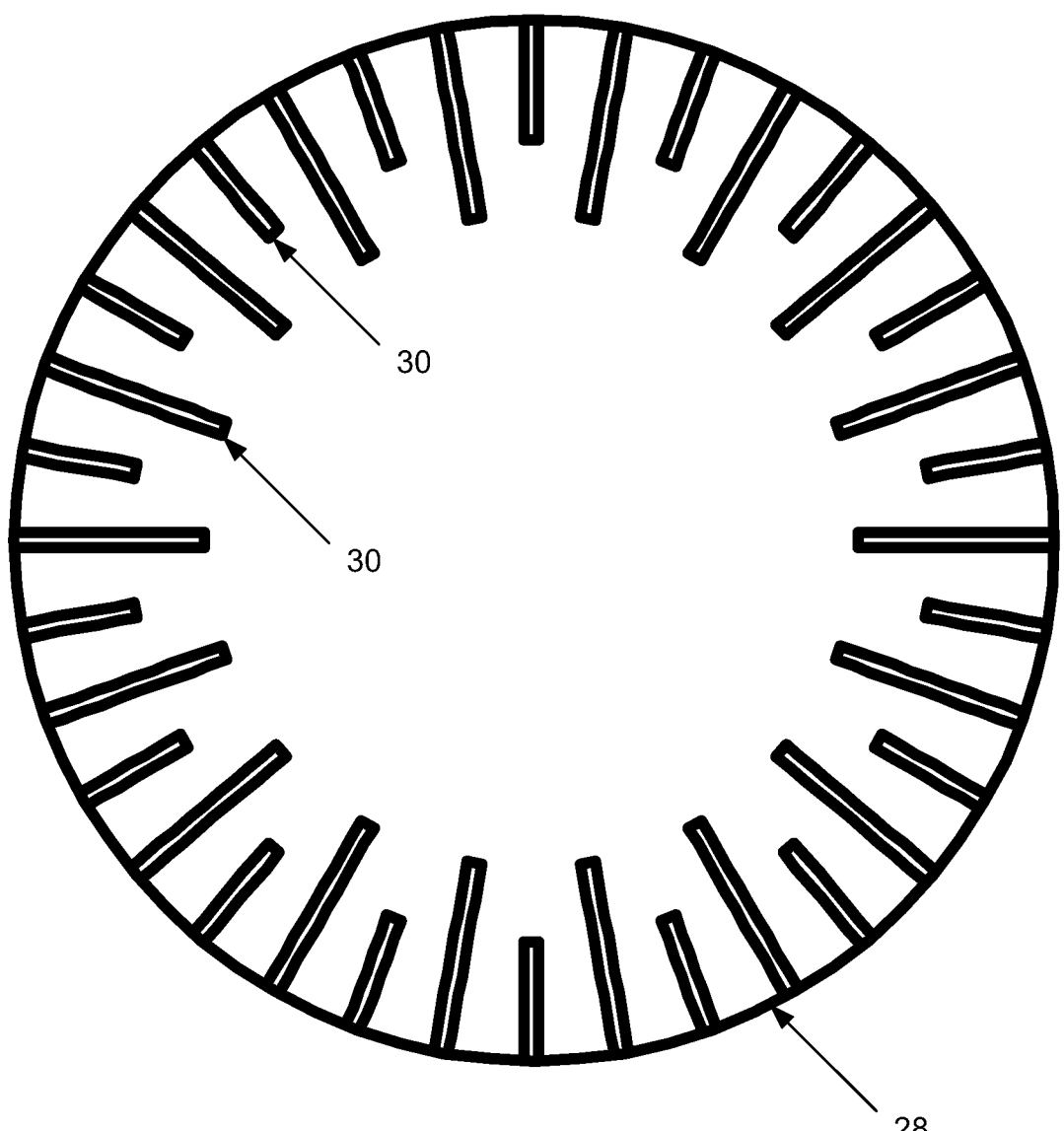
FIG. 14 is a cross-sectional view of a division wall, or radial platen, design in accordance with another embodiment of the present invention.
Figure 15:
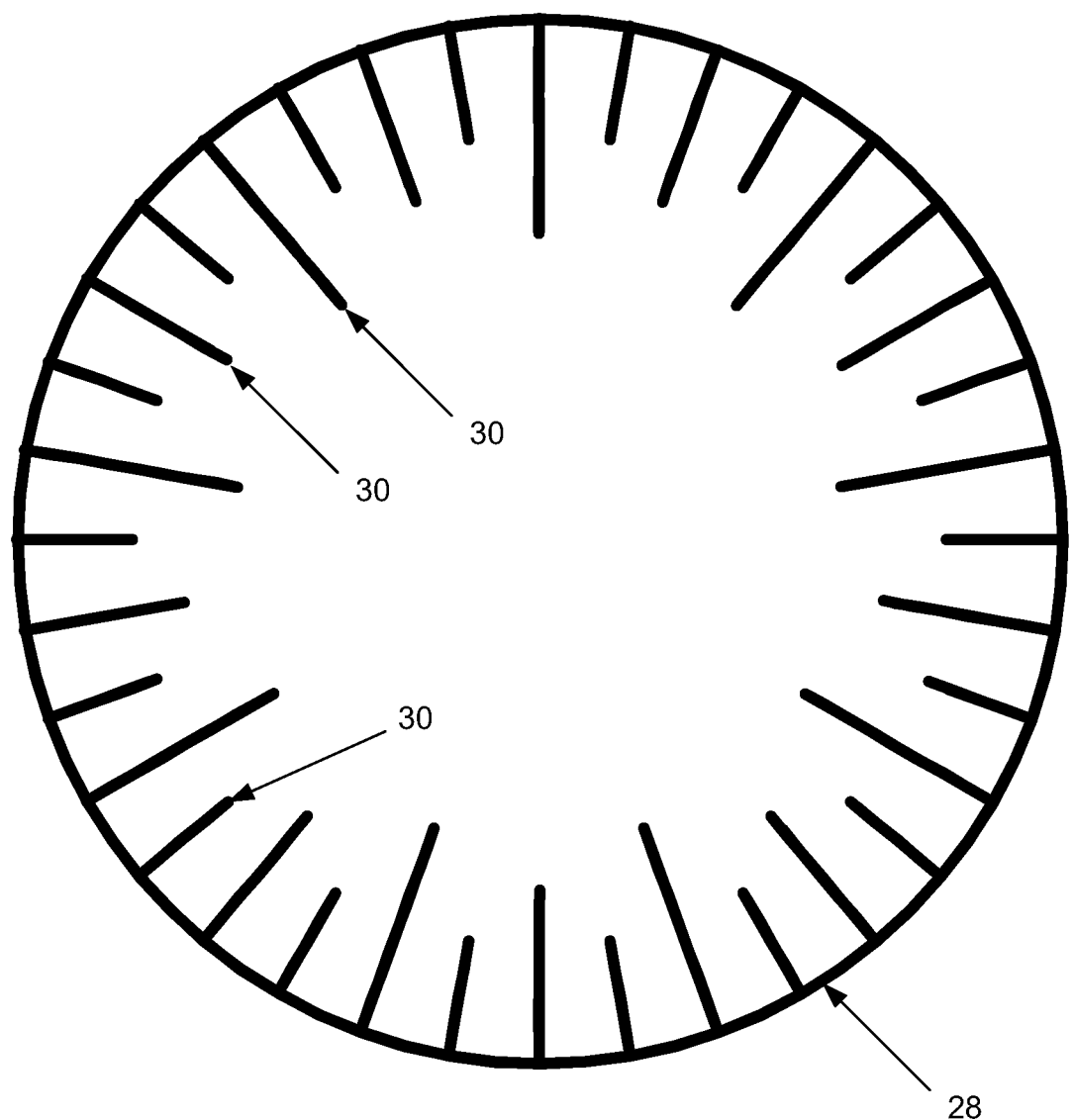
FIG. 15 is a cross-sectional view of a division wall, or radial platen, design in accordance with yet another embodiment of the present invention.
Figure 16:
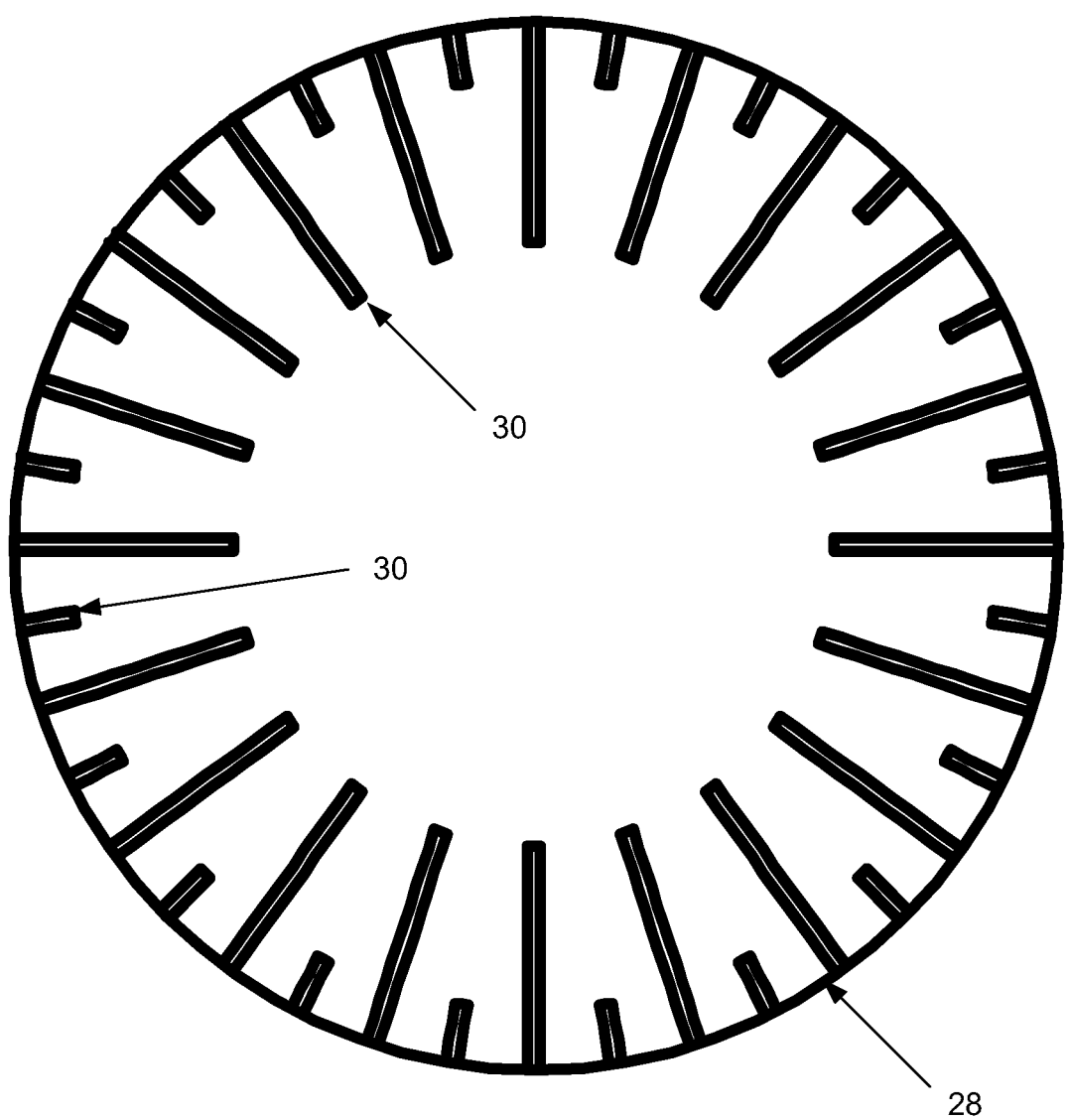
FIG. 16 is a cross-sectional view of a division wall, or radial platen, design in accordance with still another embodiment of the present invention.

With regard to the divisional wall, or radial platen, designs of the present invention heat transfer is improved by using a compact arrangement of divisional walls, or radial platens, 30 of at least two different lengths as is shown in FIGS. 13, 14 and 16. In another embodiment, the present invention utilizes divisional walls of at least three different lengths (see FIG. 15), four different lengths (not pictured), or even five or more different lengths (not pictured). It should be noted that the present invention is not limited to any one set of divisional wall, or radial platen, lengths. Rather, the divisional walls, or radial platens, can be of any length depending on the size of the RSC, or radiant boiler that contains same.

In one embodiment, the relationship between the divisional walls, or radial platens, of different lengths is defined by a ratio relationship. In one embodiment, where there are two differently sized divisional walls, the ratio of the longer divisional walls to the shorter division walls is in the range of about 1:0.15 to about 1:0.8, or from about 1:0.25 to about 1:0.75, or from about 1:0.4 to about 1:0.6, or even about 1:0.5. Here, as well as elsewhere in the specification and claims, individual range limits can be combined.

In another embodiment, where there are three differently sized divisional walls, the ratio between the long walls, medium walls, and shorter walls is in the range of about 1:0.5:0.15 to about 1:0.8:0.6, or from about 1:0.6:0.25 to about 1:0.75:0.5, or even 1:0.66:0.5. As would be apparent to one of skill in the art, any ratio of lengths between the long walls, medium walls, and short walls can be utilized in conjunction with the present invention. Additionally, the same is true in the case where there are four, five, or more differently sized platen sets.

Although the present invention is not limited to any certain number of division walls, or radial platens, 30 the present invention has, in one embodiment, between 20 and about 60 division walls, or radial platens, 30 of various lengths. In another embodiment, the number of division walls, or radial platens, 30 numbers in the range of about 25 to about 55, or about 30 to about 50, or about 35 to about 45, or even about 36 to about 40.

In another embodiment, in a circular RSC, or radiant boiler, the spacing between the division walls, or radial platens, 30 is less than or equal to about 18 degrees, less than or equal to about 16 degrees, less than or equal to about 15 degrees, less than or equal to about 14 degrees, less than or equal to about 12 degrees, less than or equal to about 10 degrees, less than or equal to about 8 degrees, or even less than or equal to about 6 degrees.

The division wall, or radial platen, deigns of the present invention feature a larger number of shorter platens to: (a) concentrate more heated surface into the same annular region to reduce vessel length; and/or (b) concentrate the same amount of heated surface into an annulus with a smaller outside diameter to reduce vessel diameter. In one embodiment, the clearance between neighboring platens is maintained with an alternating pattern of short and long radial platens around the perimeter of the furnace. In one embodiment, the present invention enables one to maintain the base diameter while increasing efficiency and heat transfer while not adversely increasing fouling and/or plugging issues.

One advantage of the present invention is that the divisional walls, or platen surfaces, are concentrated in the annular region near the cage-wall to benefit from gas flow patterns caused by buoyancy and natural convection. Radiation heat transfer in pressurized coal-gasification systems is limited by optically thick media of the gas-solids mixture. Therefore, the gas in the center of the furnace does not exchange heat with the cage-wall efficiently. However, gas flow is "attracted" to the cool surfaces by buoyancy and natural convection and little if any gas flow circumvents the platens through the center of the furnace. Heat transfer by radiation and convection is more effective near the cage walls due to the prevailing flow distribution and higher gas velocities. This claim can be verified with computational fluid dynamics (CFD) and heat transfer modeling results described below.

Another advantage of the present invention is that particle deposition and the potential for fouling and plugging is minimized when the divisional walls, or platens, are aligned with the direction of gas flow as the incoming jet expands outward radially. This claim can be verified with CFD and a rudimentary model for turbulent flow and deposition of large particles. In one embodiment, a minimum side-clearance of 12 inches between adjacent platens is needed to reduce the potential for ash deposits forming a bridge between adjacent divisional walls, or platen surfaces. This arrangement allows visual inspection of divisional walls, or platen surfaces, and cage-wall surfaces from the center of the furnace without obstructions. There is also room for maintenance personnel to access tubes for closer inspection and repair (within arms reach).

Figure 17:
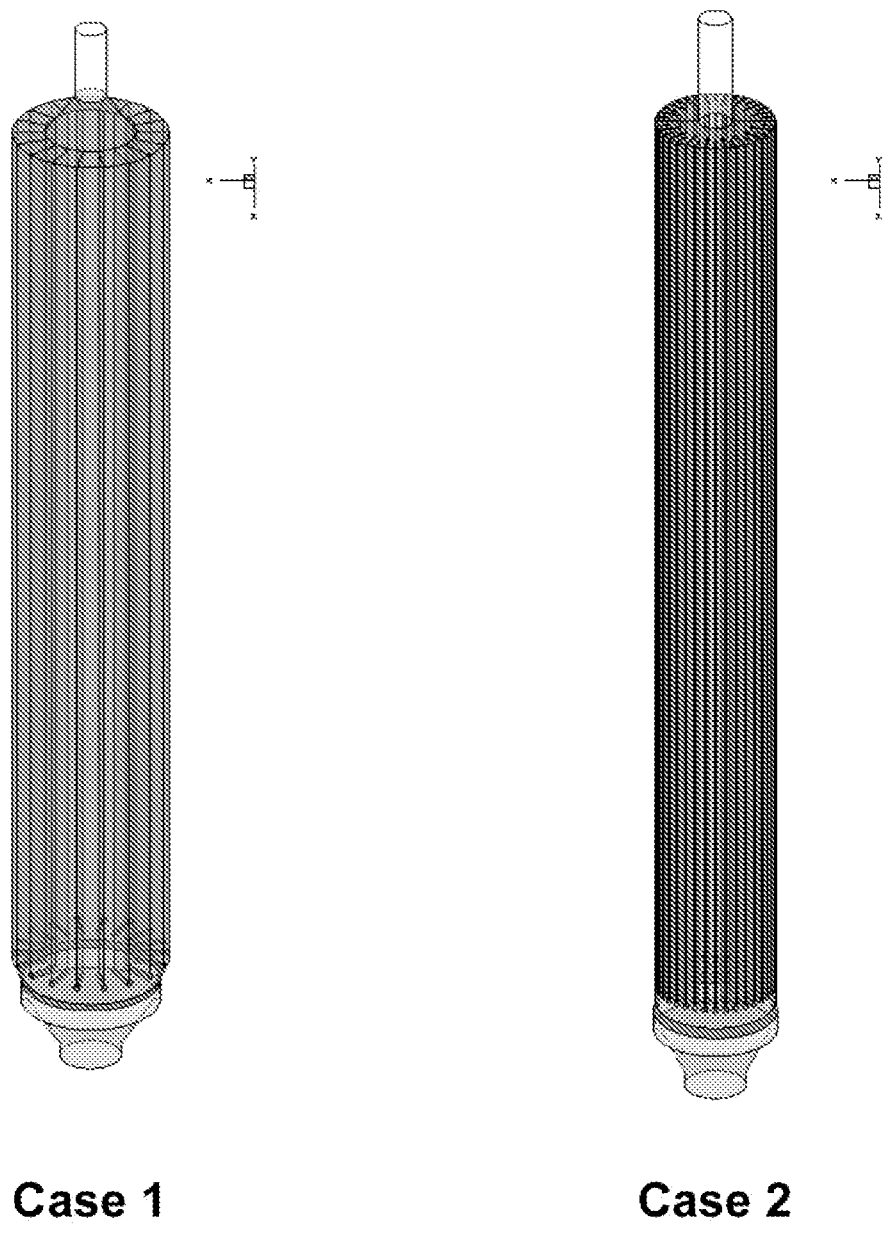
FIG. 17 is a illustration of a prior art RSC design compared to a RSC design of one embodiment of the present invention.
Figure 18:
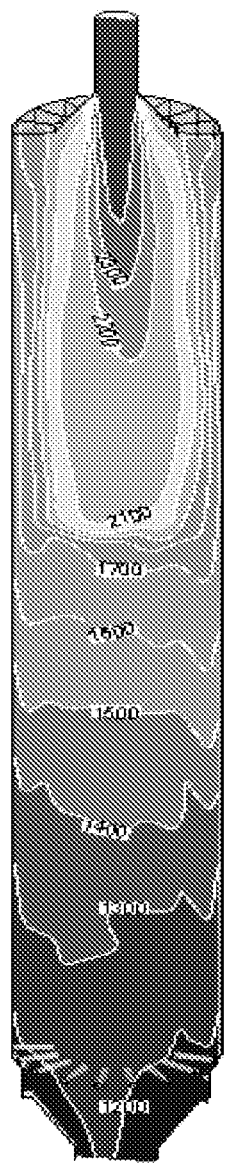
FIG. 18 is a comparison of the predicted gas temperatures in a prior art RSC design compared to a RSC design of one embodiment of the present invention.
Figure 18:
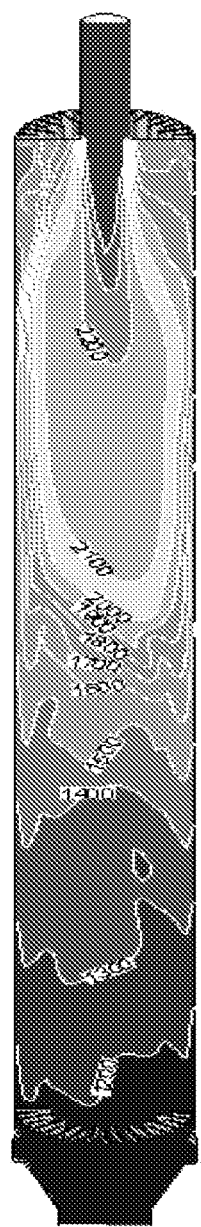
Figure 19:
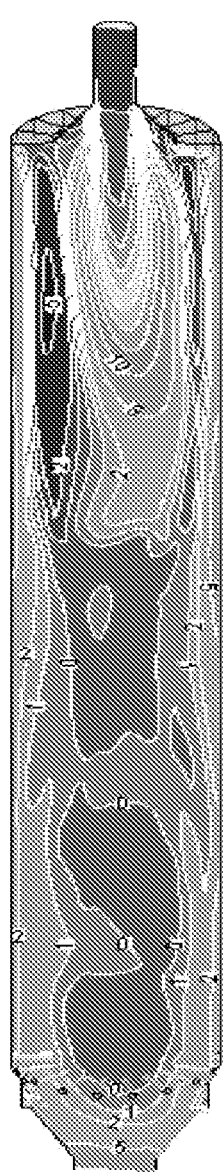
FIG. 19 is a comparison of the predicted axial velocity in feet/second in a prior art RSC design compared to a RSC design of one embodiment of the present invention.
Figure 19:
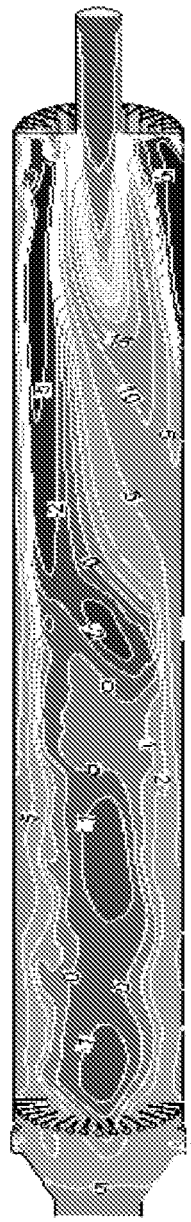

The furnace geometry for two platen arrangements is shown in FIG. 17 and CFD results model predictions of gas temperature and velocity for Case 1 and 2 are compared in FIGS. 18 and 19. In general, the gas temperature is relatively uniform over the plan area of the furnace for these designs (FIG. 18). However, the flow is strongly biased to the cage-wall, with recirculation or upward flow in the center (FIG. 19). The effect of buoyancy and natural circulation has a large influence on the flow patterns in the lower two-thirds of the furnace. The cooler gas near the platens and cage walls is denser and has a tendency to sink under the influence of gravity. The hotter gases, near the center of the furnace at the top, are lighter and have a tendency to rise (or stagnate). The axial velocity (positive in the downward direction) is always a maximum near the walls, and a minimum (or upward) near the center. Therefore most of the gas flow passes between the platens, in proximity to the cage-wall, before it exits the furnace.

Figure 20:
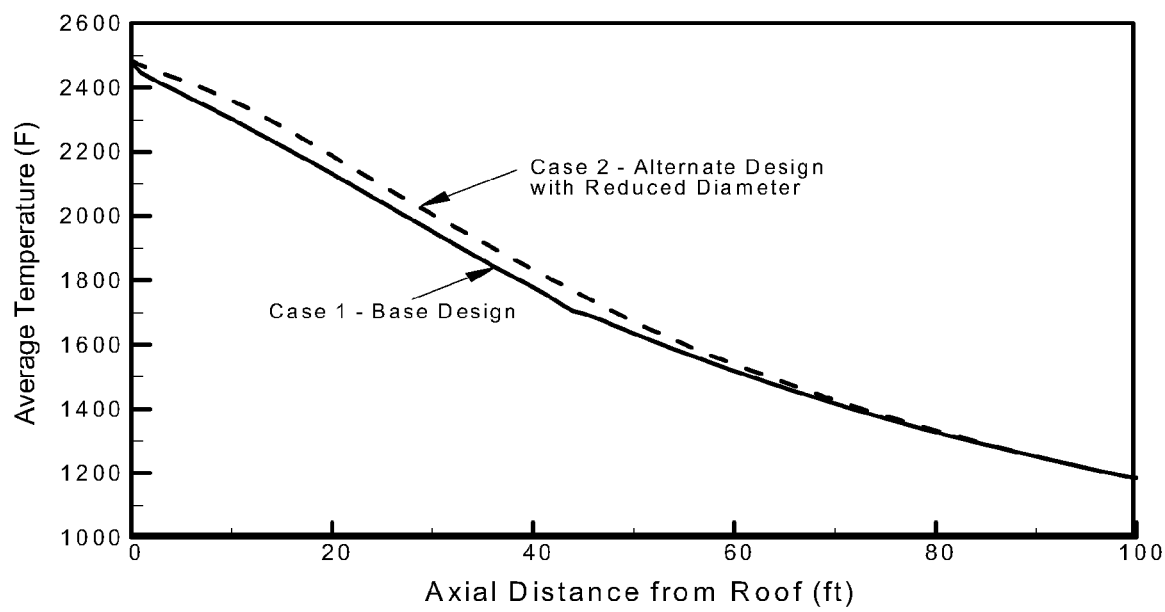
FIG. 20 is a comparison of plots of average temperature versus axial distance from the roof in a prior art RSC design compared to a RSC design of one embodiment of the present invention.

The average gas temperature profiles for the two designs are compared in FIG. 20. The temperature profile is nearly the same for both designs (Cases 1 and 2), however the cage-wall diameter is 23% smaller in Case 2, which represents a significant savings in vessel size and cost.

The fate of large particles (molten slag dripping from the inlet throat) is shown in Table 1 for three cases, as predicted by CFD. The base design with radial platens has the lowest deposition on the cage walls and platens. Deposition on the platens is 150% higher for the alternate design with reduced diameter. However, deposition is 500% higher for the case with the non-planar platen arrangements. Therefore, radial platens are the preferred arrangement that minimizes fouling and plugging.

TABLE 1

| | | Fate of Large Particles | | | |
|---|---|---|---|---|---|
| Case | Description | Cage Walls[1] | Platens[2] | Hopper | Outlet |
| 1 | Base Design with 18 Equal Length Radial Platens (FIG. 12) | 1.9% | 11.3% | 42.0% | 44.9% |
| 2 | Present Invention 36 Radial Platens of Two Lengths (FIG. 14) | 1.9% | 28.9% | 24.9% | 44.3% |
| 3 | Base Design with Non-Planar Platens | 12.0% | 67.8% | 9.5% | 10.8% |

[1]Includes cage-wall headers.
[2]Includes platen headers.

Although the invention has been described in detail with particular reference to certain embodiments detailed herein, other embodiments can achieve the same results. Variations and modifications of the present invention will be obvious to those skilled in the art and the present invention is intended to cover in the appended claims all such modifications and equivalents.

We claim:

1. A synthesis gas cooler for extracting heat from synthesis gas produced by a gasification process, comprising:
   a shell having a synthesis gas inlet and a synthesis gas outlet;
   a fluid-cooled flue contained within the shell for receiving synthesis gas;
   a combination of at least one quench means and at least one convective heat transfer means, wherein the combination of the at least one quench means and the at least one convective heat transfer means extends from a position vertically above to a position adjacent the synthesis gas outlet, the combination of the at least one quench means and the at least one convective heat transfer means designed to form a quench zone designed to cool and humidify the synthesis gas prior to exit thereof through the synthesis gas outlet;
   fluid-cooled radiant heat transfer surface partially extending within the flue for cooling the synthesis gas;
   a dip tube, wherein the dip tube has an inner and outer surface; and
   means for conveying the synthesis gas from the flue to the synthesis gas outlet,
   wherein the combination of the dip tube, the at least one quench means and the at least one convective heat transfer means extends from a position vertically above the synthesis gas outlet through a position adjacent the synthesis gas outlet to a position vertically below the synthesis gas outlet,
   wherein the at least one convective heat transfer means is formed from a plurality of horizontally oriented tubes, wherein the plurality of horizontally oriented tubes are formed so as to surround the outer surface of the dip tube,
   wherein the at least one quench means is formed from a plurality of nozzles mounted to the inner surface of the dip tube, and
   wherein the fluid-cooled radiant heat transfer surface comprises at least two sets of platens, a first set of platens having a first radial length and a second set of platens having a second radial length where the first radial length is longer than the second radial length.

2. The synthesis gas cooler according to claim 1, wherein the first set and second set of platens are arranged in an alternating manner.

3. The synthesis gas cooler according to claim 1, wherein the ratio of the radial lengths of the first set of platens to the radial lengths of the second set of platens is in the range of about 1:0.15 to about 1:0.8.

4. The synthesis gas cooler according to claim 3, wherein the ratio of the radial lengths of the first set of platens to the radial lengths of the second set of platens is in the range of about 1:0.25 to about 1:0.75.

5. The synthesis gas cooler according to claim 4, wherein the ratio of the radial lengths of the first set of platens to the radial lengths of the second set of platens is in the range of about 1:0.4 to about 1:0.6.

6. The synthesis gas cooler according to claim 1, wherein the total number of radial platens is in the range of about 20 to about 60.

7. The synthesis gas cooler according to claim 6, wherein the total number of radial platens is in the range of about 25 to about 55.

8. The synthesis gas cooler according to claim 7, wherein the total number of radial platens is in the range of about 30 to about 50.

9. The synthesis gas cooler according to claim 8, wherein the total number of radial platens is in the range of about 35 to about 45.

10. The synthesis gas cooler according to claim 1, wherein the at least one quench means is formed from at least one quench spray level.

11. The synthesis gas cooler according to claim 10, wherein at least one quench spray level is formed from multiple spray nozzles designed to supply a fluid into an area surrounding the at least one quench means.

12. The synthesis gas cooler according to claim 1, wherein the at least one convective heat transfer means is formed from one or more banks of tubes wherein each individual tube is oriented in a horizontal plane.

13. A synthesis gas cooler for extracting heat from synthesis gas produced by a gasification process, comprising:
    a shell having a synthesis gas inlet and a synthesis gas outlet;
    a fluid-cooled flue contained within the shell for receiving synthesis gas;
    a combination of at least one quench means and at least one convective heat transfer means, wherein the combination of the at least one quench means and the at least one convective heat transfer means extends from a position vertically above to a position adjacent the synthesis gas outlet, the combination of the at least one quench means and the at least one convective heat transfer means designed to form a quench zone designed to cool and humidify the synthesis gas prior to exit thereof through the synthesis gas outlet;
    fluid-cooled radiant heat transfer surface partially extending within the flue for cooling the synthesis gas;
    a dip tube, wherein the dip tube has an inner and outer surface; and
    means for conveying the synthesis gas from the flue to the synthesis gas outlet,
    wherein the combination of the dip tube, the at least one quench means and the at least one convective heat transfer means extends from a position vertically above the synthesis gas outlet through a position adjacent the synthesis gas outlet to a position vertically below the synthesis gas outlet,
    wherein the at least one convective heat transfer means is formed from a plurality of horizontally oriented tubes, wherein the plurality of horizontally oriented tubes are formed so as to surround the outer surface of the dip tube,
    wherein the at least one quench means is formed from a plurality of nozzles mounted to the inner surface of the dip tube, and
    wherein the fluid-cooled radiant heat transfer surface comprises at least three sets of platens, a first set of platens having a first radial length, a second set of platens having a second radial length, and a third set of platens having a third radial length, where the first radial length is longer than the second radial length and the second radial length is longer than the third radial length.

14. The synthesis gas cooler according to claim 13, wherein the first set, second set and third set of platens are arranged in an alternating manner.

15. The synthesis gas cooler according to claim 13, wherein the ratio of the radial lengths of the first set of platens to the second set of platens to the third set of platens is in the range of about 1:0.5:0.15 to about 1:0.8:0.6.

16. The synthesis gas cooler according to claim 15, wherein the ratio of the radial lengths of the first set of platens to the second set of platens to the third set of platens is in the range of about 1:0.6:0.25 to about 1:0.75:0.5.

17. The synthesis gas cooler according to claim 16, wherein the ratio of the radial lengths of the first set of platens to the second set of platens to the third set of platens is in the range of about 1:0.66:0.5.

18. The synthesis gas cooler according to claim 13, wherein the total number of radial platens is in the range of about 20 to about 60.

19. The synthesis gas cooler according to claim 18, wherein the total number of radial platens is in the range of about 25 to about 55.

20. The synthesis gas cooler according to claim 19 wherein the total number of radial platens is in the range of about 30 to about 50.

21. The synthesis gas cooler according to claim 13, wherein the at least one quench means is formed from at least one quench spray level.

22. The synthesis gas cooler according to claim 21, wherein at least one quench spray level is formed from multiple spray nozzles designed to supply a fluid into an area surrounding the at least one quench means.

23. The synthesis gas cooler according to claim 13, wherein the at least one convective heat transfer means is formed from one or more banks of tubes wherein each individual tube is oriented in a horizontal plane.

24. A synthesis gas cooler for extracting heat from synthesis gas produced by a gasification process, comprising:
a shell having a synthesis gas inlet and a synthesis gas outlet;
a fluid-cooled flue contained within the shell for receiving synthesis gas;
a combination of at least one quench means and at least one convective heat transfer means, wherein the combination of the at least one quench means and the at least one convective heat transfer means extends from a position vertically above to a position adjacent the synthesis gas outlet, the combination of the at least one quench means and the at least one convective heat transfer means designed to form a quench zone designed to cool and humidify the synthesis gas prior to exit thereof through the synthesis gas outlet;
fluid-cooled radiant heat transfer surface partially extending within the flue for cooling the synthesis gas;
a dip tube, wherein the dip tube has an inner and outer surface, and
means for conveying the synthesis gas from the flue to the synthesis gas outlet,
wherein the combination of the dip tube, the at least one quench means and the at least one convective heat transfer means extends from a position vertically above the synthesis gas outlet through a position adjacent the synthesis gas outlet to a position vertically below the synthesis gas outlet,
wherein the at least one convective heat transfer means is formed from a plurality of horizontally oriented tubes, wherein the plurality of horizontally oriented tubes are formed so as to surround the outer surface of the dip tube,
wherein the at least one quench means is formed from a plurality of nozzles mounted to the inner surface of the dip tube, and
wherein the fluid-cooled radiant heat transfer surface comprises at least four sets of platens, a first set of platens having a first radial length, a second set of platens having a second radial length, a third set of platens having a third radial length, and a fourth set of platens having a fourth radial length, where the first radial length is longer than the second radial length, the second radial length is longer than the third radial length, and the third radial length is longer than the fourth radial length.

25. The synthesis gas cooler according to claim 24, wherein the ratio of the radial lengths of the first set of platens to the second set of platens to the third set of platens to the fourth set of platens is in the range of about 1:0.8:0.5:0.25 to about 1:0.5:0.3:0.15.

26. The synthesis gas cooler according to claim 24, wherein the first set, the second set, the third set and the fourth set of platens are arranged in an alternating manner.

27. The synthesis gas cooler according to claim 24, wherein the at least one quench means is formed from at least one quench spray level.

28. The synthesis gas cooler according to claim 27, wherein at least one quench spray level is formed from multiple spray nozzles designed to supply a fluid into an area surrounding the at least one quench means.

29. The synthesis gas cooler according to claim 24, wherein the at least one convective heat transfer means is formed from one or more banks of tubes wherein each individual tube is oriented in a horizontal plane.

* * * * *